US012759388B2

(12) United States Patent
Lian et al.

(10) Patent No.: US 12,759,388 B2
(45) Date of Patent: Oct. 13, 2026

(54) VEHICLE

(71) Applicant: BYD COMPANY LIMITED, Shenzhen (CN)

(72) Inventors: Yubo Lian, Shenzhen (CN); Bengang Yi, Shenzhen (CN); Heping Ling, Shenzhen (CN); Junfei Yan, Shenzhen (CN); Tengyong Liu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 251 days.

(21) Appl. No.: 18/775,631

(22) Filed: Jul. 17, 2024

(65) Prior Publication Data

US 2024/0367499 A1 Nov. 7, 2024

Related U.S. Application Data

(63) Continuation of application No. PCT/CN2023/085391, filed on Mar. 31, 2023.

(30) Foreign Application Priority Data

Mar. 31, 2022 (CN) ......................... 202210346551.8

(51) Int. Cl.
*B60K 1/04* (2019.01)
*B60L 50/60* (2019.01)
(Continued)

(52) U.S. Cl.
CPC ................ *B60K 1/04* (2013.01); *B60L 50/64* (2019.02); *B60L 50/66* (2019.02); *B62D 21/03* (2013.01);
(Continued)

(58) Field of Classification Search
CPC ................ B60K 1/04; B60K 2001/005; B60K 2001/0438; B60L 50/64; B60L 50/66;
(Continued)

(56) References Cited

U.S. PATENT DOCUMENTS

| | | | |
|---|---|---|---|
| 2017/0001507 | A1 | 1/2017 | Ashraf et al. |
| 2018/0111483 | A1 | 4/2018 | Nakayama |

(Continued)

FOREIGN PATENT DOCUMENTS

| | | | |
|---|---|---|---|
| CN | 203902672 | U | 10/2014 |
| CN | 107922005 | A | 4/2018 |

(Continued)

OTHER PUBLICATIONS

International Search Report and Written Opinion for Application No. PCT/CN2023/085391, mailed on Jul. 18, 2023, 10 pages.

(Continued)

*Primary Examiner* — Timothy Hannon

(74) *Attorney, Agent, or Firm* — Sheppard Mullin Richter & Hampton LLP

(57) ABSTRACT

A vehicle includes an underbody, a rear subframe, and a battery pack. The rear subframe is connected to the underbody. The battery pack is connected to the underbody and is disposed on a lower side of the underbody. A front end surface of the rear subframe includes a limiting surface for the battery pack to extend backward, and at least a part of an upper surface of the battery pack forms a portion of at least a portion of a floor of a vehicle body.

18 Claims, 10 Drawing Sheets

(51) Int. Cl.

| | |
|---|---|
| ***B60L 50/64*** | (2019.01) |
| ***B62D 21/03*** | (2006.01) |
| ***B62D 25/02*** | (2006.01) |
| ***H01M 50/204*** | (2021.01) |
| ***H01M 50/242*** | (2021.01) |
| ***H01M 50/249*** | (2021.01) |

(52) U.S. Cl.

CPC ........ *B62D 25/025* (2013.01); *H01M 50/204* (2021.01); *H01M 50/242* (2021.01); *H01M 50/249* (2021.01); *B60K 2001/0438* (2013.01); *H01M 2220/20* (2013.01)

(58) Field of Classification Search

CPC ...... B62D 21/03; B62D 21/157; B62D 21/11; B62D 21/155; B62D 25/025; B62D 25/20; B62D 25/2018; B62D 25/2027; B62D 25/2036; H01M 50/204; H01M 50/242; H01M 50/249; H01M 2220/20

See application file for complete search history.

(56) References Cited

U.S. PATENT DOCUMENTS

| | | | |
|---|---|---|---|
| 2018/0273093 | A1 | 9/2018 | Tanaka et al. |
| 2019/0100090 | A1 | 4/2019 | Matecki et al. |
| 2020/0062310 | A1 | 2/2020 | Wang et al. |
| 2020/0086928 | A1 | 3/2020 | Morimoto et al. |

FOREIGN PATENT DOCUMENTS

| | | | |
|---|---|---|---|
| CN | 109204496 | A | 1/2019 |
| CN | 110329361 | A | 10/2019 |
| CN | 110329362 | A | 10/2019 |
| CN | 209581624 | U | 11/2019 |
| CN | 111038591 | A | 4/2020 |
| CN | 111169547 | A | 5/2020 |
| CN | 210852640 | U | 6/2020 |
| CN | 111376983 | A | 7/2020 |
| CN | 211731599 | U | 10/2020 |
| CN | 212220399 | U | 12/2020 |
| CN | 112572608 | A | 3/2021 |
| CN | 213007574 | U | 4/2021 |
| CN | 113086007 | A | 7/2021 |
| CN | 113306380 | A | 8/2021 |
| CN | 113548117 | A | 10/2021 |
| CN | 214688993 | U | 11/2021 |
| CN | 214928920 | U | 11/2021 |
| CN | 113968283 | A | 1/2022 |
| CN | 215590471 | U | 1/2022 |
| CN | 114083972 | A | 2/2022 |
| CN | 215752636 | U | 2/2022 |
| CN | 114940055 | A | 8/2022 |
| DE | 10 2017 205447 | B4 | 10/2020 |
| JP | H06-270692 | A | 9/1994 |
| JP | 2003-291857 | A | 10/2003 |
| JP | 2017-196960 | A | 11/2017 |
| WO | 2019/001532 | A1 | 1/2019 |

OTHER PUBLICATIONS

Notice of Reasons for Refusal dated Jul. 15, 2025, issued in Japanese Patent Application No. 2024-538326, with English machine translation (10 pages).

First Office Action and Search Report dated Dec. 20, 2025, issued in Chinese Patent Application No. 202310843618.3, with English machine translation (13 pages).

First Office Action and Search Report dated Dec. 4, 2025, issued in Chinese Patent Application No. 202310842579.5, with English machine translation (17 pages).

First Office Action and Search Report dated Dec. 19, 2025, issued in Chinese Patent Application No. 202310845414.3, with English machine translation (15 pages).

First Office Action and Search Report dated Dec. 1, 2025, issued in Chinese Patent Application No. 202310844466.9, with English machine translation (11 pages).

Second Office Action dated Feb. 12, 2026, issued in Chinese Patent Application No. 202310844466.9, with English machine translation (13 pages).

Request for the Submission of an Opinion dated Jan. 5, 2026, issued in Korean Patent Application No. 10-2024-7021201, with English machine translation (13 pages).

Decision of Refusal dated Dec. 23, 2025, issued in Japanese Patent Application No. 2024-538326, with English machine translation (9 pages).

Examination Report No. 1 dated Apr. 17, 2025, issued in related Australian Patent Application No. 202324710 (3 pages).

Extended European Search Report dated Mar. 18, 2025, issued in related European Patent Application No. 23778436.8 (9 pages).

First Office Action and Search Report dated Sep. 28, 2022, issued in related Chinese Patent Application No. 202210346551.8, with English machine translation (19 pages).

Second Office Action dated Jan. 13, 2023, issued in related Chinese Patent Application No. 202210346551.8, with English machine translation (19 pages).

VEHICLE

CROSS-REFERENCE TO RELATED APPLICATIONS

This application is a continuation application of International Patent Application No. PCT/CN2023/085391, filed on Mar. 31, 2023, which is based on and claims priority to and benefits of Chinese Patent Application No. 202210346551.8, filed on Mar. 31, 2022. The entire content of all of the above-referenced applications is incorporated herein by reference.

FIELD

The present disclosure relates to the field of vehicles, and in particular, to a vehicle.

BACKGROUND

In the related art, in an existing new energy vehicle, a battery pack mounting longitudinal beam is generally arranged below a floor of a vehicle body for mounting a battery pack. However, due to a structure of an underbody, an available space for the battery pack is small, and a large gap is formed between the battery pack and the floor of the vehicle body, which affects both endurance of the vehicle and moving ability of the vehicle.

SUMMARY

The present disclosure resolves at least one of technical problems existing in the related art. Therefore, the present disclosure provides a vehicle, and the vehicle has high space utilization and good safety performance.

A vehicle according to embodiments of the present disclosure includes an underbody, a rear subframe, and a battery pack. The rear subframe is connected to the underbody. The battery pack is connected to the underbody and is disposed on a lower side of the underbody. A front end surface of the rear subframe includes a limiting surface for the battery pack to extend backward, and at least a part of an upper surface of the battery pack forms at least a portion of a floor of a vehicle body.

According to the vehicle in the embodiments of the present disclosure, the front end surface of the rear subframe forms the limiting surface for the battery pack to extend backward, so that a size of the battery pack in a front-rear direction can be increased, to improve space utilization, and the battery pack can be used as a force transmission structure to perform force transmission, to improve safety performance of the vehicle. The at least a part of the upper surface of the battery pack forms at least a portion of the floor of the vehicle body, so that space in an up-down direction of the vehicle can be increased, and the space utilization and occupant space are increased.

In some embodiments, a minimum distance between a rear end surface of the battery pack and the front end surface of the rear subframe is L, where L satisfies: 10 mm≤L≤100 mm.

In some embodiments, the underbody further includes a first rocker rail and a second rocker rail. The second rocker rail is disposed opposite to the first rocker rail in a width direction of the vehicle body, and the battery pack is connected and mounted to the first rocker rail and the second rocker rail.

In some embodiments, the underbody includes two rear longitudinal beams. The two rear longitudinal beams are disposed spaced apart in the width direction of the vehicle body, and a height of a bottom surface of a front section of the rear longitudinal beam with respect to the ground in a height direction of the vehicle body is higher than a height of a top surface of the battery pack with respect to the ground in a height direction of the vehicle body.

In some embodiments, the underbody further includes a rear cross beam. The rear cross beam extends in a width direction of the vehicle body, and is connected to the rear longitudinal beams and the first rocker rail and the second rocker rail.

In some embodiments, a lower surface of the rear cross beam is spaced apart from the top surface of the battery pack in a height direction of the vehicle body to form a sealed gap.

In some embodiments, the rear cross beam includes a left connecting plate of the rear cross beam, a right connecting plate of the rear cross beam, and a rear cross beam body. The left connecting plate of the rear cross beam, the rear cross beam body, and the right connecting plate of the rear cross beam are connected.

In some embodiments, the rear longitudinal beam includes a left rear longitudinal beam and a right rear longitudinal beam. The left rear longitudinal beam is connected to the left connecting plate of the rear cross beam, and the right rear longitudinal beam is connected to the right connecting plate of the rear cross beam.

In some embodiments, the left connecting plate of the rear cross beam is arranged on a front section of the left rear longitudinal beam, and the right connecting plate of the rear cross beam is disposed on a front section of the right rear longitudinal beam. The left connecting plate of the rear cross beam is connected to the first rocker rail and a left section of the rear cross beam body.

The right connecting plate of the rear cross beam is connected to the second rocker rail and a right section of the rear cross beam body.

In some embodiments, the rear cross beam further includes a first boss disposed on the left connecting plate of the rear cross beam, and a second boss disposed on the right connecting plate of the rear cross beam.

A rear subframe mounting point is disposed on each of the first boss and the second boss, and the first boss and the second boss are disposed on a rear side of the rear cross beam body in a length direction of the vehicle body. Heights of a lower side surface of the first boss and of a lower end surface of the second boss with respect to the ground in the height direction of the vehicle body are higher than a height of a lower side surface of the rear cross beam body with respect to the ground in the height direction of the vehicle body.

In some embodiments, the underbody further includes a rear-seat front cross beam. The rear-seat front cross beam extends in the width direction of the vehicle body, and is connected to the rear longitudinal beam, the first rocker rail, and the second rocker rail. A height of a lower surface of the rear-seat front cross beam with respect to the ground in the height direction of the vehicle body is higher than a height of the upper surface of the battery pack with respect to the ground in the height direction of the vehicle body.

In some embodiments, two ends of the rear-seat front cross beam are respectively connected to the left rear longitudinal beam and the right rear longitudinal beam. The rear-seat front cross beam, the left rear longitudinal beam, the rear cross beam, and the right rear longitudinal beam are connected to form a closed frame structure.

In some embodiments, the left rear longitudinal beam includes a front section of the left rear longitudinal beam. A front portion of the front section of the left rear longitudinal beam is connected to the rear-seat front cross beam, a rear portion of the front section of the left rear longitudinal beam is connected to the left connecting plate of the rear cross beam, and a height of a bottom of the front section of the left rear longitudinal beam with respect to the ground in the height direction of the vehicle body is higher than the height of the upper surface of the battery pack with respect to the ground in the height direction of the vehicle body. The right rear longitudinal beam includes a front section of the right rear longitudinal beam. A front portion of the front section of the right rear longitudinal beam is connected to the rear-seat front cross beam, a rear portion of the front section of the right rear longitudinal beam is connected to the right connecting plate of the rear cross beam, and a height of a bottom of the front section of the right rear longitudinal beam with respect to the ground in the height direction of the vehicle body is higher than the height of the upper surface of the battery pack with respect to the ground in the height direction of the vehicle body.

In some embodiments, the underbody includes a first rocker rail and a second rocker rail. The second rocker rail is arranged opposite to the first rocker rail in a width direction of the vehicle body. A rear end surface of the battery pack is beyond a rear end surface of the first rocker rail and a rear end surface of the second rocker rail in a length direction of the vehicle body.

In some embodiments, the vehicle further includes a front subframe. The front subframe is connected to the underbody. A rear end surface of the front subframe includes a limiting surface for the battery pack to extend forward.

In some embodiments, the underbody further includes a front longitudinal beam. A bottom surface of a rear end of the front longitudinal beam is spaced apart from the top surface of the battery pack in a height direction of the vehicle body to form a sealed gap.

In some embodiments, the battery pack includes an upper housing of the battery pack housing, a lower housing of the battery pack, and at least one battery core. The upper housing of the battery pack and the lower housing of the battery pack form an accommodating space, and the at least one battery core is disposed in the accommodating space. At least a part of an upper surface of the upper housing of the battery pack forms at least a portion of the floor of the vehicle body, the battery core is connected to the upper housing of the battery pack, and a top surface of the battery core is bonded with the upper housing of the battery pack. The lower housing of the battery pack is a cooling plate, and a bottom surface of the battery core is bonded with the lower housing of the battery pack through a heat-conductive adhesive.

In some embodiments, the battery pack includes multiple battery cores. A length direction of the multiple battery cores is consistent with the length direction of the vehicle body, and the multiple battery cores are disposed side by side in the width direction of the vehicle body.

In some embodiments, a sealing plate assembly is disposed on the underbody. The upper surface of the battery pack is sealed by the sealing plate assembly. The sealing plate assembly includes a sealing plate and at least one sealing member. The sealing member is disposed between the sealing plate and the battery pack. The sealing plate includes a first plane portion, and the battery pack includes a second plane portion. The first plane portion is opposite to the second plane portion, and the sealing member is disposed between the first plane portion and the second plane portion. A first rocker rail is disposed on a left side of the underbody, and a second rocker rail is disposed on a right side of the underbody. The sealing plate includes a left sealing plate section and a right sealing plate section. A left end of the left sealing plate section includes a left bent edge. The left sealing plate section is connected to the first rocker rail by the left bent edge. A right end of the right sealing plate section includes a right bent edge. The right sealing plate section is connected to the second rocker rail by the right bent edge. The sealing plate further includes a front sealing plate section and a rear sealing plate section. The front sealing plate section is connected to the front longitudinal beam, and the rear sealing plate section is connected to the rear cross beam.

In some embodiments, a seat cross beam extending in a width direction of the vehicle body is disposed on the underbody. A battery pack reinforcing beam extending in a width direction of the vehicle body is disposed on the battery pack, and the battery pack reinforcing beam is connected to the seat cross beam.

BRIEF DESCRIPTION OF THE DRAWINGS

The foregoing and/or additional aspects and advantages of the present disclosure become apparent and comprehensible in description for embodiments made with reference to the following accompanying drawings.

In the drawings.

Figure 1:
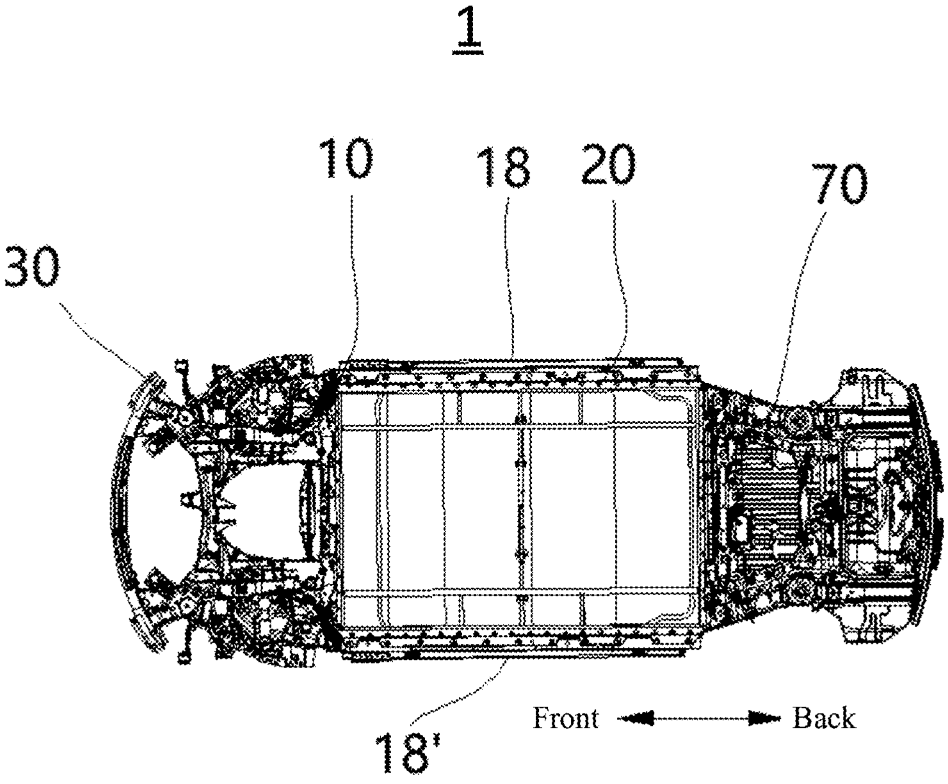
FIG. 1 is a top view of a structure of a vehicle body according to an embodiment of the present disclosure.

vehicle 1; underbody 10; rear cross beam 11; rear cross beam body 111; left connecting plate 112 of the rear cross beam; first boss 1121; right connecting plate 112' of the rear cross beam; second boss 1121'; rear-seat front cross beam 12; seat cross beam 13; A-pillar 14; rear seat frame 15; front cross beam 16; rear longitudinal beam 17; left rear longitudinal beam 1701; front section 17011 of the left rear longitudinal beam; right rear longitudinal beam 1701'; front section 17011' of the right rear longitudinal beam; first rocker rail 18; second rocker rail 18'; connecting bolt 19; battery pack 20; rear end surface 201; upper housing 2011 of the battery pack; left extension portion 20111; right extension portion 20111'; lower housing 2012 of the battery pack; accommodating space 2013; second plane portion 2014; battery pack reinforcing beam 2015; battery core 202; structural adhesive 203; heat-conductive adhesive 204; front subframe 30; central channel 40; front longitudinal beam 50; sealing plate assembly 60; sealing plate 6001; first plane portion **6001*a*; left sealing plate section 6001*b*; right sealing plate section 6001*b*'; left bent edge 6001*c*; right bent edge 6001*c*'; front sealing plate section 6001*d*; front edgefold 6001*e*; rear sealing plate section 6001*f*, sealing member 6002; rear subframe 70; front end surface 701**; force transmission region Q; and rear subframe mounting point P.

DETAILED DESCRIPTION

Embodiments of the present disclosure are described in detail below, and the embodiments described with reference to accompanying drawings are exemplary. A vehicle 1 according to the embodiments of the present disclosure is described with reference to FIG. 1 to FIG. 18. The vehicle 1 includes an underbody 10, a rear subframe 70, and a battery pack 20. An X direction is a length direction of the vehicle body of the vehicle 1, namely, a front-rear direction. A Y direction is a width direction of the vehicle 1, namely, a left-right direction. A Z direction is a height direction of the vehicle 1, namely, an up-down direction.

Figure 7:
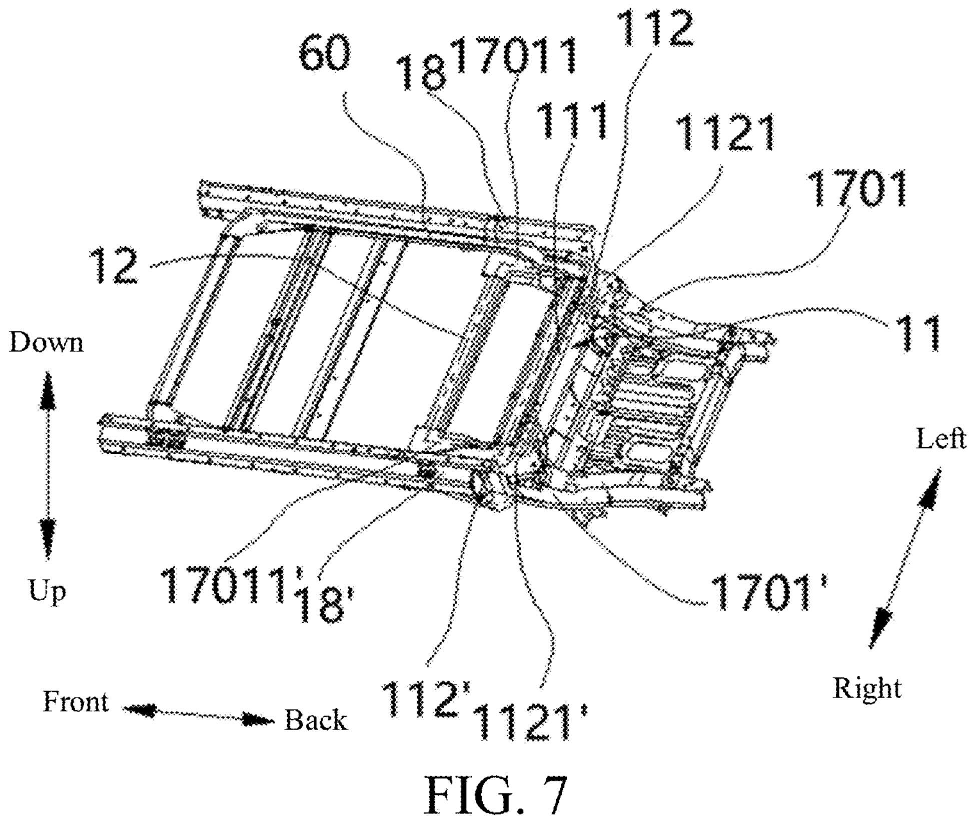
FIG. 7 is a schematic diagram of a structure of a rear portion of a vehicle body according to an embodiment of the present disclosure.
Figure 8:
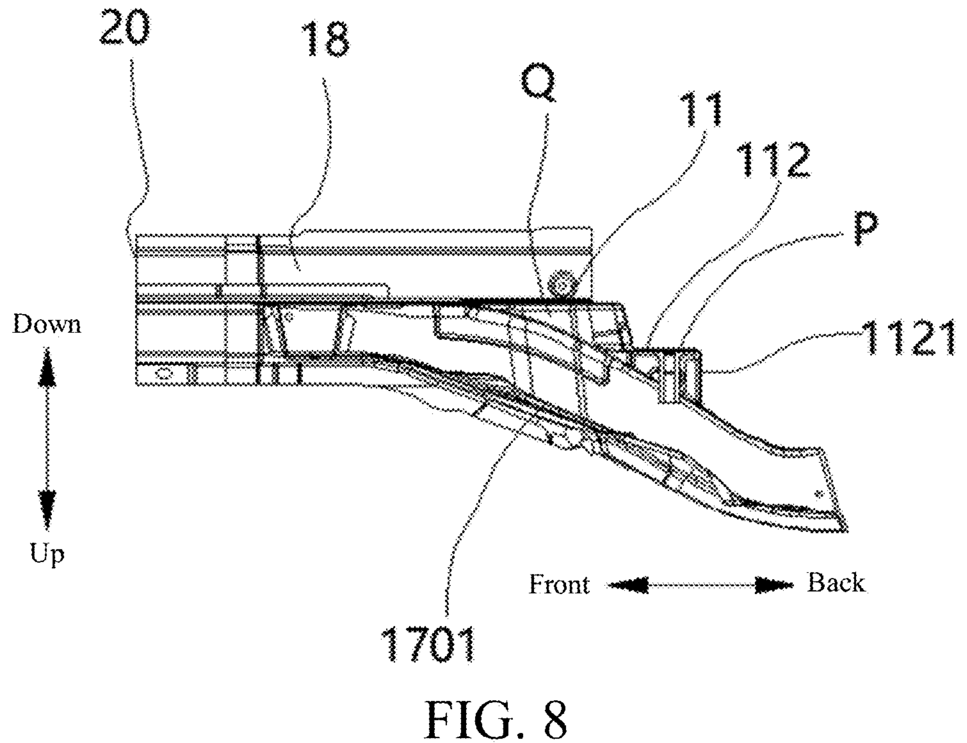
FIG. 8 is a cross-sectional view along a line A-A in FIG. 7.

In an embodiment, as shown in FIG. 7 and FIG. 8, the rear subframe 70 is connected to the underbody 10, and the battery pack 20 is connected to the underbody 10, and is arranged/disposed on a lower side of the underbody 10. A front end surface 701 of the rear subframe 70 forms a limiting surface for the battery pack 20 to extend backward. In other words, the battery pack 20 may extend to the front end surface 701 of the rear subframe 70.

In the related art, a floor of a vehicle body is a load-bearing structure of a passenger compartment, and is sealed and connected to an underbody. The underbody and a battery pack are two separately designed components. The battery pack is generally arranged/disposed below the floor of the vehicle body, and is fixedly connected to the vehicle body. Therefore, when the battery pack is mounted, an assembly gap is formed between the battery pack and the vehicle body structure in the up-down direction of the vehicle, which causes a gap to be formed between the battery pack and the floor of the vehicle body. The gap increases a height from a roof to a bottom of the battery pack in the up-down direction of the vehicle. As a result, a ground clearance of the vehicle is reduced, causing poor moving ability of the vehicle, or a height of the vehicle is increased, causing a center of gravity of the vehicle to rise, and causing a handling stability problem of the vehicle, or the height of the passenger compartment of the vehicle is reduced, affecting user experience of the vehicle. In the vehicle 1 of the present disclosure, an upper housing of the battery pack 20 and the floor of the vehicle body are integrated as a whole. The upper housing of the battery pack is used as a floor of the vehicle 1, and an individual floor of the vehicle body in the related art is eliminated, thereby reducing or eliminating a mounting gap between the floor of the vehicle body and the battery pack. Therefore, space utilization of the vehicle can be effectively improved, the ground clearance of the vehicle is effectively increased, the height of the passenger compartment is increased, the passenger experience is improved, and rising of the center of gravity is avoided. In addition, the battery pack 20 can transmit a force. When a collision occurs at a rear of the vehicle 1, the battery pack 20 may be used as a force transmission structure to transmit a rear collision force. When the collision occurs at the rear of the vehicle 1, after being subjected to a force, the rear subframe 70 comes into forward contact with a rear end surface 201 of the battery pack 20, so that the battery pack 20 participates in force transmission and transmits the force forward. Therefore, the battery pack 20 can resist and distribute force transmission, to improve safety performance of the vehicle 1.

According to the vehicle 1 in the embodiments of the present disclosure, the battery pack 20 is connected to the underbody 10, so that at least a part of an upper surface of the battery pack 20 may be used as the floor of the vehicle body, to improve the space utilization of the vehicle 1, expand a mounting space of the battery pack 20 to increase a capacity of the battery pack 20, improve the space utilization of the vehicle 1, reduce a whole vehicle height, and improve moving ability performance of the vehicle 1. The front end surface 701 of the rear subframe 70 forms the limiting surface for the battery pack 20 to extend backward, so that the mounting space of the battery pack 20 can extend backward. This can effectively increase the capacity of the battery pack 20. In addition, a spacing between the battery pack 20 and the rear subframe 70 is reduced, and projections of the battery pack 20 and the rear subframe 70 in the front-rear direction at least partially overlap, so that the battery pack 20 may be used as the force transmission structure of the vehicle 1. When the collision occurs at the rear of the vehicle 1, the rear subframe 70 may transmit a collision force to the battery pack 20, so that safety of the vehicle 1 is improved.

Figure 6:
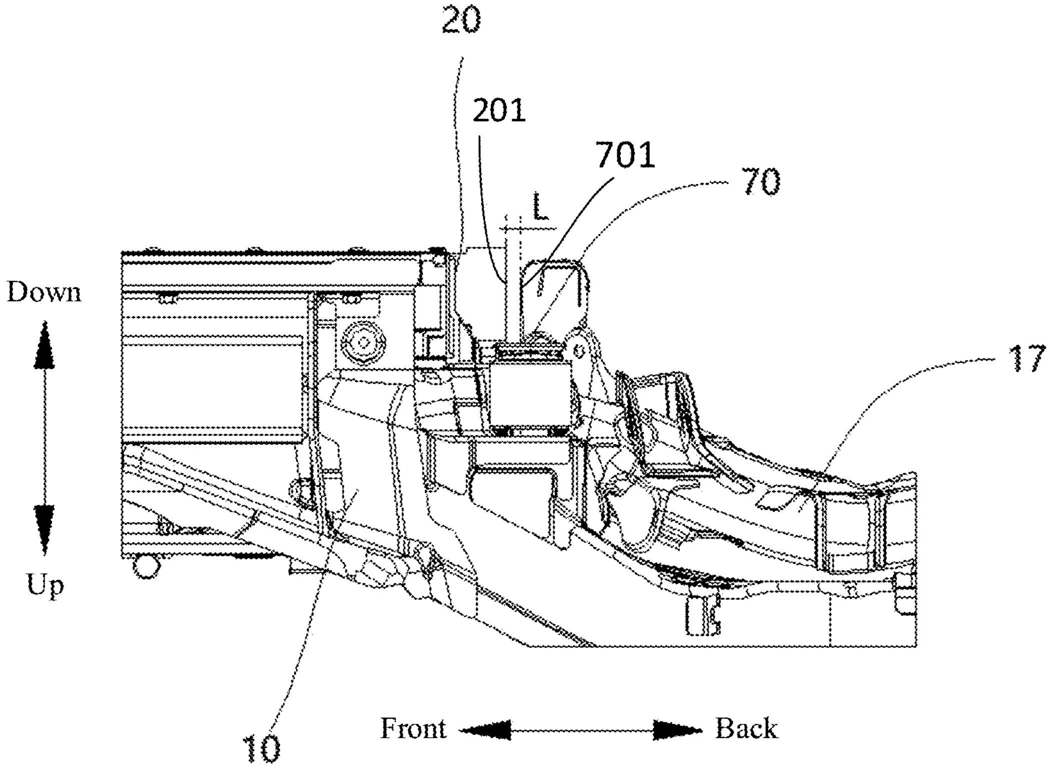
FIG. 6 is a right view of a structure of a rear portion of a vehicle body according to an embodiment of the present disclosure.

In some embodiments, as shown in FIG. 6, a minimum distance between the rear end surface 201 of the battery pack 20 and the front end surface 701 of the rear subframe 70 is L, where L satisfies: 10 mm≤L≤100 mm. Through such a configuration, while a mounting gap of the battery pack 20 is ensured, the mounting space of the battery pack 20 can be effectively increased, so that the rear end surface 201 of the battery pack 20 can be expanded backward, thereby increasing the capacity of the battery pack 20. Moreover, through such a configuration, when the collision occurs at the rear of the vehicle 1, the rear subframe 70 comes into contact with the battery pack 20, so that the rear collision force can be transmitted forward by the battery pack 20, thereby improving the safety of the vehicle 1. In addition, interference between the rear end surface 201 of the battery pack 20 and a front surface of the rear subframe 70 can be avoided. In addition, when the battery pack 20 is mounted, the front end surface 701 of the rear subframe 70 and the battery pack 20 are not directly connected, and have an interval, so that the battery pack 20 is conveniently mounted, thereby improving an assembly speed of the vehicle 1.

Figure 3:
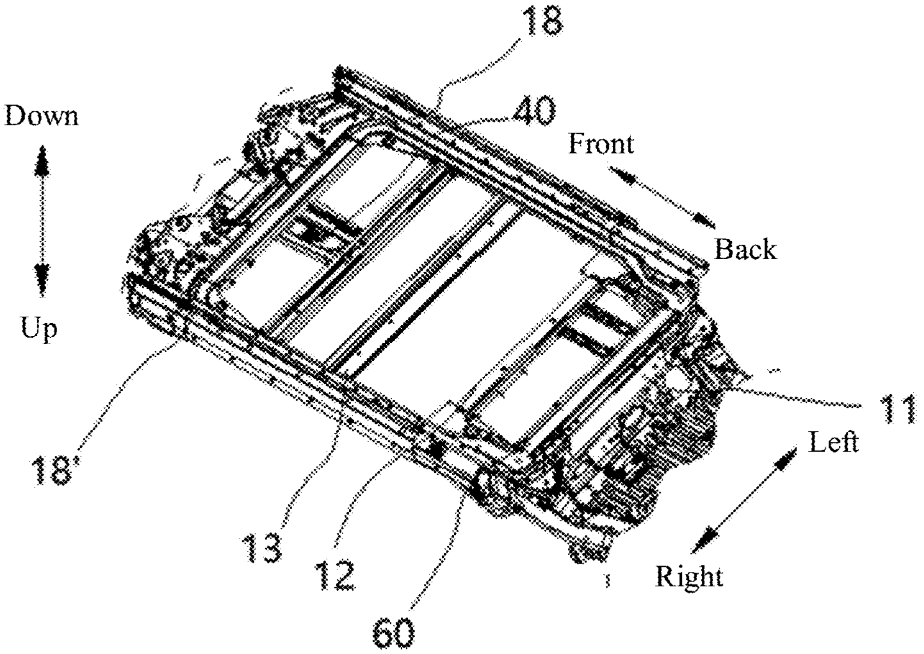
FIG. 3 is a schematic diagram of a partial structure of a vehicle body according to an embodiment of the present disclosure.

In some embodiments, as shown in FIG. 1 and FIG. 3, the underbody 10 further includes a first rocker rail 18 and a second rocker rail 18' that are oppositely arranged/disposed in the width direction of the vehicle body. The battery pack 20 is connected and mounted to the first rocker rail 18 and the second rocker rail 18', and the first rocker rail 18 and the second rocker rail 18' may form a battery pack mounting beam.

In the related art, a battery pack mounting beam independent of a rocker rail is arranged on a lower side of the floor of the vehicle body, and the battery pack mounting beam is arranged between two rocker rails of the vehicle, so that the battery pack can be mounted between the two rocker rails through the battery pack mounting beam. However, this design limits extension of the battery pack in the width direction of the vehicle, and greatly reduces the capacity of the battery pack, and the battery pack cannot be effectively integrated into a force transmission path of the vehicle.

In the vehicle 1 in the present disclosure, a left side surface of a main body of the battery pack 20 may extend to a right side of the first rocker rail 18, and a right side surface of the main body of the battery pack 20 may extend to a left side of the second rocker rail 18'. In this way, the battery pack 20 extends toward two sides in the Y-direction, and a battery pack mounting portion is connected to the first rocker rail 18 and the second rocker rail 18', so that an accommodating space of the battery pack 20 is enlarged, thereby increasing the capacity of the battery pack 20. In addition, because the rocker rails (the first rocker rail 18 and the second rocker rail 18') of the vehicle form the battery pack mounting beam, and the battery pack 20 is fixedly connected to the rocker rails (the first rocker rail 18 and the second rocker rail 18') of the vehicle, when the rocker rails perform force transmission, the battery pack 20 can effectively participate in the force transmission, so that the force transmission path of the vehicle 1 is increased, and the battery pack 20 has a large volume and a large area, to reduce force per unit area during the force transmission, reduce damage, and improve the safety performance of the vehicle 1. In short, through the foregoing configuration, a size of the battery pack 20 in the Y direction can be increased, an electricity capacity of the battery pack 20 can be increased, and endurance of the vehicle 1 is also improved. In addition, when the collision occurs on the vehicle 1, the battery pack 20 may participate in the force transmission, to improve the safety performance of the vehicle 1.

Figure 2:
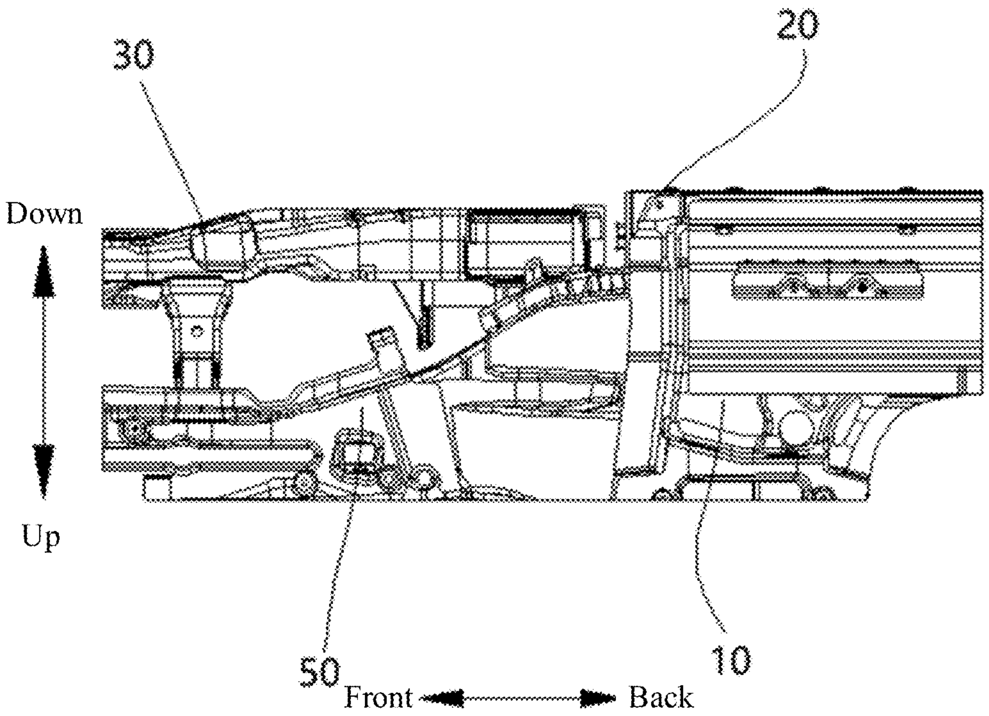
FIG. 2 is a right view of a structure of a front portion of a vehicle body according to an embodiment of the present disclosure.

In some embodiments, as shown in FIG. 1 and FIG. 2, the underbody 10 further includes a first rocker rail 18 and a second rocker rail 18' that are oppositely arranged/disposed in the width direction of the vehicle body. For example, the first rocker rail 18 is located on a left side in the width direction of the vehicle body, and the second rocker rail 18' is located on a right side in the width direction of the vehicle body. The rear end surface 201 of the battery pack 20 is beyond a rear end surface of the first rocker rail 18 and a rear end surface of the second rocker rail 18' in the length direction of the vehicle 1. Through this configuration, a length of the battery pack 20 can be effectively increased, so that the vehicle 1 has a sufficient battery pack mounting space in the length direction, and the capacity of the battery pack 20 can be effectively increased. In addition, the battery pack 20 may be close to the rear subframe 70 as much as possible, facilitating the battery pack 20 to participate in the force transmission, and improving the safety of the vehicle 1. In some other embodiments, the rear end surface 201 of the battery pack 20 may be flush with the rear end surface of the first rocker rail 18 and the rear end surface of the second rocker rail 18' in the length direction of the vehicle 1, which is not limited herein.

In some embodiments, as shown in FIG. 6 and FIG. 7, the underbody 10 includes two rear longitudinal beams 17 spaced apart in the width direction of the vehicle body, and a height of a bottom surface of a front section of the rear longitudinal beam 17 (e.g., the distance from the bottom surface to the ground) in the height direction of the vehicle is higher than a height of a top surface of the battery pack 20 (e.g., the distance from the top surface to the ground) in the height direction of the vehicle 1. It should be noted that, the "height" herein is a positional relationship, and is not a dimensional relationship. The bottom surface of the front section of the rear longitudinal beam 17 is located above the upper surface of the battery pack 20 in the Z direction of the vehicle 1. The "above" herein may be obliquely above or directly above, which is not limited herein. Through this configuration, a case in which the front end of the rear longitudinal beam 17 hinders mounting and backward extension of the battery pack 20 can be avoided, and it is convenient for the battery pack 20 to be arranged on the lower side of the underbody 10, so that the battery pack mounting space of the vehicle 1 in the front-rear direction can be effectively increased, and the capacity of the battery pack 20 is further increased, thereby improving the assembly speed of the vehicle 1, and facilitating high-speed production of the vehicle 1.

In some embodiments, as shown in FIG. 1 and FIG. 6, the vehicle 1 further includes a front subframe 30, and the front subframe 30 is connected to the underbody 10. Arear end surface of the front subframe 30 forms a limiting surface for the battery pack 20 to extend forward. Through this configuration, the battery pack 20 may extend to the rear end surface of the front subframe 30, and an extension size of the battery pack 20 in the front-rear direction is increased. In addition, the battery pack 20 may extend to the front subframe 30, so that when a collision occurs on a front side of the vehicle 1, the battery pack 20 may simultaneously perform the force transmission as the force transmission structure.

For example, the rear end surface of the front subframe 30 forms the limiting surface for the battery pack 20 to extend forward. When the vehicle 1 normally travels, the rear end surface of the front subframe 30 is spaced apart from the front end surface of the battery pack 20. When a collision occurs on a front surface of the vehicle 1, after being subjected to a backward force, the front subframe 30 comes into contact with the front end surface of the battery pack 20, so that the battery pack 20 can participate in the force transmission. Therefore, the battery pack 20 can resist and distribute the force transmission, to improve the safety performance of the vehicle 1. In other words, through this configuration, the size of the battery pack 20 in the X direction can be increased, the space utilization is improved, and the capacity of the battery pack 20 is increased. In addition, the battery pack 20 can distribute a front collision force, to improve the safety performance of the vehicle 1.

In some embodiments, as shown in FIG. 2, at least a mounting gap is provided between the front end surface of the battery pack 20 and the rear end surface of the front subframe 30. Through this configuration, a large distance between the front end surface of the battery pack 20 and the rear end surface of the front subframe 30 can be avoided, thereby increasing an extension space of the battery pack 20 in the X direction, and enlarging an accommodating space of the battery pack 20. In addition, the front subframe 30 can come into contact with the battery pack 20 for the force transmission, and the battery pack 20 cannot interfere with the vehicle 1 when being mounted.

Figure 4:
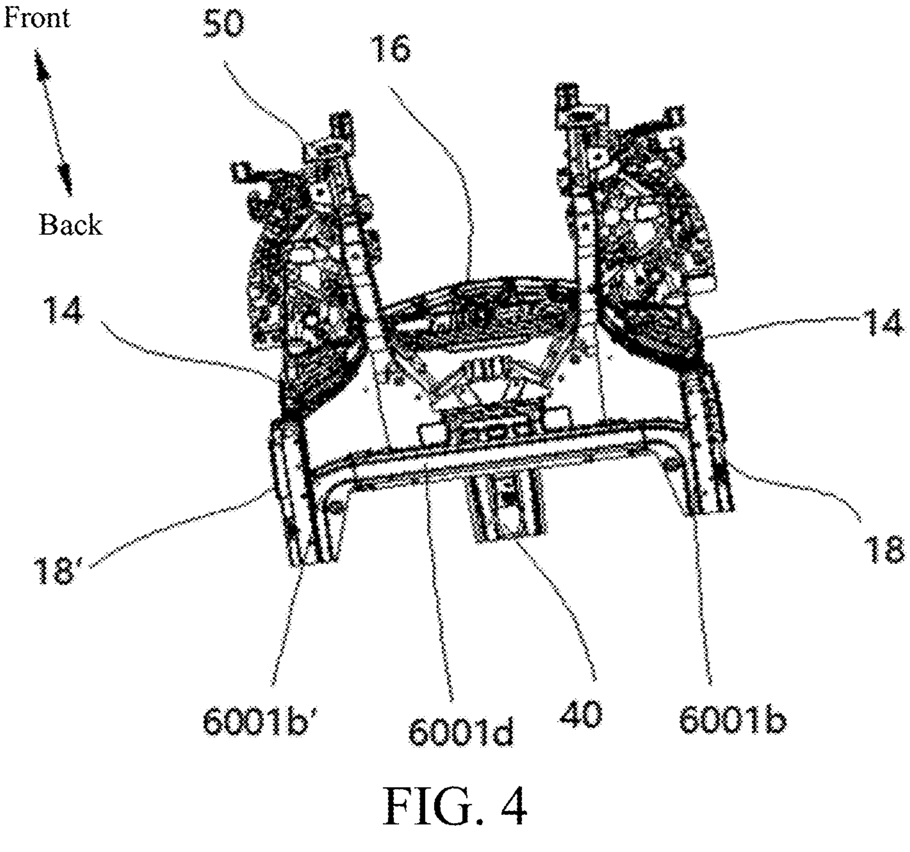
FIG. 4 is a schematic diagram of a structure of a front portion of a vehicle body according to an embodiment of the present disclosure, where a bottom surface of a front cross beam is shown in the figure.
Figure 5:
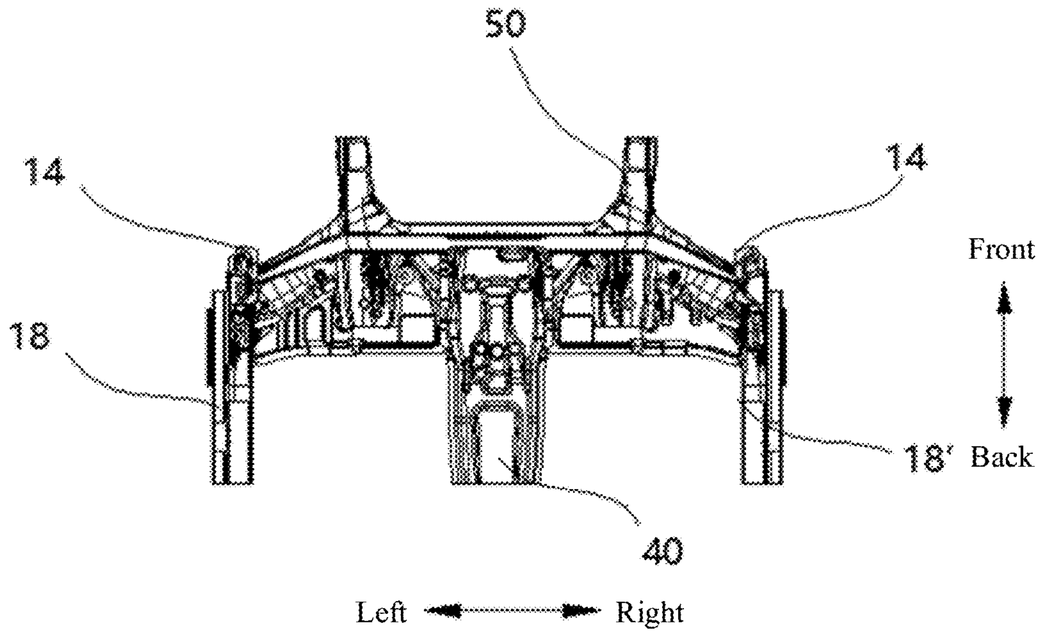
FIG. 5 is a bottom view of a structure of a front portion of a vehicle body according to an embodiment of the present disclosure.

In some embodiments, as shown in FIG. 4 and FIG. 5, the underbody 10 further includes a front cross beam 16 and oppositely arranged A-pillars 14. The front cross beam 16 is arranged/disposed between the two A-pillars 14, and left and right ends of the front cross beam 16 are separately connected to the two A-pillars 14. When a collision occurs on the vehicle 1, the front cross beam 16 may transmit the front collision force from the vehicle 1 to the two A-pillars 14, or transmit a side collision force from one A-pillar 14 to the other A-pillar 14, so that the force transmission path of the vehicle 1 is effectively increased, and damage to the vehicle 1 by the collision is reduced, thereby improving the safety of the vehicle 1. In some embodiments, as shown in FIG. 2, FIG. 4, and FIG. 5, the underbody 10 further includes two front longitudinal beams 50. A rear section of the front longitudinal beam 50 is connected to the front cross beam 16, so that the collision force from the front side of the vehicle 1 can be transmitted to the front cross beam 16 through the front longitudinal beam 50, and further transmitted, through the front cross beam 16, to the A-pillar 14 and a central channel 40 connected to the front cross beam 16. Therefore, the collision force from the front side can be effectively distributed through the front cross beam 16, to form multiple force transmission paths, so that the damage to the vehicle 1 by the collision force is reduced, thereby enhancing structural stability of the vehicle 1, and improving the safety performance of the vehicle 1.

In some embodiments, as shown in FIG. 2 and FIG. 4, the underbody 10 further includes a front longitudinal beam 50. A rear end bottom surface of the front longitudinal beam 50 is spaced apart from the top surface of the battery pack 20 in a vertical direction to form a sealed gap. The rear end bottom surface of the front longitudinal beam 50 is spaced apart from the top surface of the battery pack 20, so that a sealed structure is easily arranged between the front longitudinal beam 50 and the battery pack 20. In addition, because the front longitudinal beam 50 is spaced apart from the battery pack 20, before the battery pack 20 extends toward the front longitudinal beam 50, the front longitudinal beam 50 does not hinder the battery pack 20, so that the front longitudinal beam 50 does not interfere with the battery pack 20, and mounting of the battery pack 20 is not hindered. Therefore, the battery pack mounting space of the vehicle 1 in the front-rear direction can be effectively enlarged, thereby increasing the capacity of the battery pack 20 and facilitating the mounting of the battery pack 20.

In some embodiments, referring to FIG. 3 and with reference to FIG. 4, the front longitudinal beam 50 is connected to the rocker rails and the central channel 40. The rocker rails include the first rocker rail 18 and the second rocker rail 18'. The first rocker rail 18 is located on a left side of the vehicle 1, and the second rocker rail 18' is located on a right side of the vehicle 1. The central channel 400 may be located between the first rocker rail 18 and the second rocker rail 18' of the vehicle 1. Through this configuration, when the collision occurs on the vehicle 1, a force may be transmitted to the first rocker rail 18, the second rocker rail 18', and the central channel 40 through the front longitudinal beam 50, so that multiple force transmission paths can be effectively formed, and a force transmission capability of the vehicle 1 is improved.

In some embodiments, referring to FIG. 3 and FIG. 4 and with reference to FIG. 6 and FIG. 7, the underbody 10 further includes a rear cross beam 11 and two rear longitudinal beams 17 spaced apart. The rear cross beam 11 extends in the width direction of the vehicle 1, and is connected to the rear longitudinal beam 17 and the rocker rails (e.g., the first rocker rail 18 and the second rocker rail 18'). For example, two ends of the rear cross beam 11 are respectively connected to the first rocker rail 18 and the second rocker rail 18', and the rear cross beam 11 is connected to a front section of the rear longitudinal beam 17. A height of a lower surface of the rear cross beam 11 (e.g., the distance from the lower surface to the ground) is higher than a height of the upper surface of the battery pack 20 (e.g., the distance from the upper surface to the ground), and a front section of the rear longitudinal beam 17 is arranged on a side of the rear cross beam 11 away from the battery pack 20. Through this configuration, extension of the battery pack 20 cannot be hindered, and the mounting space of the battery pack 20 can be enlarged. In addition, when the vehicle 1 is subjected to a collision force, a force applied to the rear longitudinal beam 17 can be transmitted to the rear cross beam 11, and then transmitted to the rocker rails through the rear cross beam 11, thereby increasing the force transmission path, and improving force transmission efficiency.

The rear cross beam 11 is further configured as a battery pack mounting beam, that is, the rear cross beam 11 and the battery pack 20 are fixedly connected. Therefore, a force applied to the rear cross beam 11 may be transmitted to the battery pack 20 through a connecting member, so that the battery pack 20 is added to the force transmission path. In addition, based on a large-area characteristic of the battery pack 20, a force transmission effect can be effectively enhanced. It may be understood that the force transmitted from the rear longitudinal beam 17 to the rear cross beam 11 may be transmitted to the first rocker rail 18 and the second rocker rail 18' on two sides through the rear cross beam 11, and can be further transmitted to the battery pack 20 through the rear cross beam 11, thereby forming multiple force transmission paths. In addition, an area of the force transmission structure is increased through the battery pack 20. This can effectively reduce collision damage to the vehicle 1.

In some embodiments, as shown in FIG. 7, the rear cross beam 11 forms the battery pack mounting beam. A rear end of the battery pack 20 may be connected to the rear cross beam 11 through the connecting member. The upper surface of the battery pack 20 may be spaced apart from the lower surface of the rear cross beam 11 in the vertical direction (e.g., the height direction of the vehicle body), to form a sealed gap. When the battery pack 20 is connected to the rear cross beam 11, a sealing member 6001 may be further arranged between the battery pack 20 and the rear cross beam 11 to form a seal, thereby effectively avoiding entry of foreign objects into the passenger compartment. The battery pack 20 is mounted on the rear cross beam 11, so that the accommodating space of the battery pack 20 in a length direction can be expanded, thereby increasing the capacity of the battery pack 20, and improving the endurance of the vehicle 1.

In some embodiments, as shown in FIG. 7 and FIG. 8, the rear cross beam 11 includes a left connecting plate 112 of the rear cross beam, a right connecting plate 112' of the rear cross beam, and a rear cross beam body 111. The left connecting plate 112 of the rear cross beam, the rear cross beam body 111, and the right connecting plate 112' of the rear cross beam are connected in sequence. The left connecting plate 112 of the rear cross beam may be adapted to at least a part of a surface of a left end of the rear cross beam body 111, and the right connecting plate 112' of the rear cross beam may be adapted to at least a part of a surface of a right end of the rear cross beam body 111. In this way, the left connecting plate 112 of the rear cross beam and the right connecting plate 112' of the rear cross beam can improve connection reliability between the rear cross beam 11 and the rear longitudinal beam 17, and improve the safety of the vehicle 1.

In some embodiments, as shown in FIG. 7 and FIG. 8, the rear longitudinal beam 17 includes a left rear longitudinal beam 1701 and a right rear longitudinal beam 1701'. The left rear longitudinal beam 1701 is connected to the left connecting plate 112 of the rear cross beam, and the right rear longitudinal beam 1701' is connected to the right connecting plate 112' of the rear cross beam. The left rear longitudinal beam 1701 is connected to the left connecting plate 112 of the rear cross beam, and the left connecting plate 112 of the rear cross beam is connected to the left end of the rear cross beam body 111. The right rear longitudinal beam 1701' is connected to the right connecting plate 112' of the rear cross beam, and the right connecting plate 112' of the rear cross beam is connected to the right end of the rear cross beam body 111. Through this configuration, the left connecting plate 112 of the rear cross beam and the right connecting plate 112' of the rear cross beam may enable, when the collision occurs on the rear end of the vehicle 1, the rear collision force to be transmitted forward from the rear end of the vehicle 1 through the rear longitudinal beam 17, to the left connecting plate 112 of the rear cross beam, the right connecting plate 112' of the rear cross beam, and the rear cross beam body 111, to guide the collision force to be transmitted in the width direction of the vehicle 1. This can distribute the force applied to the vehicle 1 when the collision occurs on the rear side, so that the rear collision force can be relieved, and deformation of the vehicle after being subjected to the rear collision force is avoided, thereby improving a force bearing capability of the vehicle 1, and improving the safety of the vehicle 1.

In some embodiments, as shown in FIG. 7 and FIG. 8, the left connecting plate 112 of the rear cross beam is arranged on a front section of the left rear longitudinal beam 1701, and the right connecting plate 112' of the rear cross beam is arranged/disposed on a front section of the right rear longitudinal beam 1701'. The left connecting plate 112 of the rear cross beam is connected to both the left end of the rear cross beam body 111 and the first rocker rail 18, and the right connecting plate 112' of the rear cross beam is connected to both the right end of the rear cross beam body 111 and the second rocker rail 18'.

Through this configuration, the left connecting plate 112 of the rear cross beam and the right connecting plate 112' of the rear cross beam may enable, when a collision occurs on the rear end of the vehicle 1, the rear collision force to be transmitted forward from the rear end of the vehicle 1 through the rear longitudinal beam 17, to the left connecting plate 112 of the rear cross beam, the right connecting plate 112' of the rear cross beam, and the rear cross beam body 111, to guide the collision force to be transmitted in the width direction of the vehicle 1, and to be guided through joints between the left connecting plate 112 of the rear cross beam and the first rocker rail 18 and between the right connecting plate 112' of the rear cross beam and the second rocker rail 18', to be transmitted toward the first rocker rail 18 and the second rocker rail 18'. This can distribute a force applied to the rear side of the vehicle 1 during the collision, so that the rear collision force is relieved, and the force carrying capability and the safety of the vehicle 1 are improved.

In some embodiments, as shown in FIG. 7 and FIG. 8, a first boss 1121 is arranged on the left connecting plate 112 of the rear cross beam, and a second boss 1121' is arranged on the right connecting plate 112' of the rear cross beam. A rear subframe mounting point P is arranged on each of the first boss 1121 and the second boss 1121', and the first boss 1121 and the second boss 1121' are arranged on a rear side of the rear cross beam body 111 in the length direction of the vehicle 1. The first boss 1121 and the second boss 1121' may protrude from the rear cross beam body 111 in the length direction of the vehicle 1, and a cross-sectional area of a protruding part in a width direction may gradually decrease.

In some embodiments of the present disclosure, the rear subframe mounting point P configured to be mounted to the rear subframe 70 is arranged below the rear cross beam 11. The rear cross beam 11 and the rear subframe 70 are mounted and fixed at the rear subframe mounting point P through a bolt. A force transmission structure is buckled at the rear subframe mounting point P, so that the rear longitudinal beam 17 and the battery pack 20 form a force transmission region Q, ensuring effectiveness of rear force transmission, and improving the safety of the vehicle 1.

The first boss 1121 is arranged on the left connecting plate 112 of the rear cross beam, and the second boss 1121' is arranged on the right connecting plate 112' of the rear cross beam. The rear subframe mounting point P is arranged on each of the first boss 1121 and the second boss 1121', and the first boss 1121 and the second boss 1121' are arranged on the rear side of the rear cross beam body 111 in the length direction of the vehicle 1.

In some embodiments, as shown in FIG. 7 and FIG. 8, heights of a lower end surface of the first boss 1121 (e.g., the distance from the lower end surface to the ground) and of a lower end surface of the second boss 1121' (e.g., the distance from the lower end surface to the ground) in the height direction of the vehicle 1 are higher than a height of a lower end surface of the rear cross beam 11 (e.g., the distance from the lower end surface to the ground). It should be noted that, the "height" herein is a positional relationship, and is not a dimensional relationship. Through this configuration, the first boss 1121 and the second boss 1121' can avoid interference between the rear subframe 70 and the rear longitudinal beam 17. Structural strength of the first boss 1121 and the second boss 1121' is improved, connection reliability between the first boss 1121 and the rear longitudinal beam 17 and between the second boss 1121' and the rear longitudinal beam 17 is improved, the force carrying capability of the force transmission region Q is improved, the effectiveness of the rear force transmission is ensured, and the safety of the vehicle 1 is improved.

In some embodiments, as shown in FIG. 7, the left rear longitudinal beam 1701 includes a front section 17011 of the left rear longitudinal beam. A front portion of the front section 17011 of the left rear longitudinal beam is connected to the rear-seat front cross beam 12, a rear portion of the front section 17011 of the left rear longitudinal beam is connected to the left connecting plate 112 of the rear cross beam, and a height of a bottom of the front section 17011 of the left rear longitudinal beam (e.g., the distance from the bottom to the ground) in the height direction of the vehicle 1 is higher than the height of the upper surface of the battery pack 20 (e.g., the distance from the upper surface to the ground). The right rear longitudinal beam 1701' includes a front section 17011' of the right rear longitudinal beam. A front portion of the front section 17011' of the right rear longitudinal beam is connected to the rear-seat front cross beam 12, a rear portion of the front section 17011' of the right rear longitudinal beam is connected to the right connecting plate 112' of the rear cross beam, and a height of a bottom of the front section 17011' of the right rear longitudinal beam (e.g., the distance from the bottom to the ground) in the height direction of the vehicle 1 is higher than the height of the upper surface of the battery pack 20 (e.g., the distance from the upper surface to the ground). It should be noted that, the "height" herein is a positional relationship, and is not a dimensional relationship. Through this configuration, the left rear longitudinal beam 1701 and the right rear longitudinal beam 1701' may be located above the battery pack 20, so that the upper surface of the battery pack 20 is risen to extend to below a bottom of the front section 17011 of the left rear longitudinal beam and a bottom of the front section 17011' of the right rear longitudinal beam, thereby enlarging an accommodating space of the battery pack 20 in the height direction, increasing the space utilization and a passenger space, and lowering the whole vehicle height.

In some embodiments, as shown in FIG. 7 with reference to FIG. 6, the underbody 10 further includes a rear-seat front cross beam 12. The rear-seat front cross beam 12 extends in the width direction of the vehicle 1, and is connected to the rear longitudinal beam 17 and the first rocker rail 18 and the second rocker rail 18'. A passenger seat of the vehicle 1 may be arranged on the rear-seat front cross beam 12, and the rear-seat front cross beam 12 extends in the width direction of the vehicle 1. A left end of the rear-seat front cross beam 12 may be connected to the left rear longitudinal beam 1701 and a rear end of the first rocker rail 18, and a right end of the rear-seat front cross beam 12 may be connected to the right rear longitudinal beam 1701' and a rear end of the second rocker rail 18'. Through this configuration, the rear-seat front cross beam 12 may enable, when a collision occurs on the rear side of the vehicle 1, the rear collision force to be transmitted to the rear-seat front cross beam 12 through the rear longitudinal beam 17, so that the rear collision force is relieved and distributed, thereby improving the force carrying capability of the vehicle 1, and improving the safety of the vehicle 1.

In addition, when the collision occurs on the left side or the right side of the vehicle 1, the rear-seat front cross beam 12 may participate in the force transmission, so that the side collision force is relieved, damage to the vehicle 1 caused by a concentrated force is avoided, and the safety of the vehicle 1 can be improved.

In some embodiments, as shown in FIG. 7, a height of a lower surface of the rear-seat front cross beam 12 (e.g., the distance from the lower surface to the ground) in the height direction of the vehicle 1 is higher than the height of the upper surface of the battery pack 20 (e.g., the distance from the upper surface to the ground). It should be noted that, the "height" herein is a positional relationship, and is not a dimensional relationship. The height of the lower surface of the rear-seat front cross beam 12 (e.g., the distance from the lower surface to the ground) in the Z direction is higher than the height of the upper surface of the battery pack 20 (e.g., the distance from the upper surface to the ground), so that a case in which a configuration of the rear-seat front cross beam 12 hinders the extension of the battery pack 20 in the Z direction can be avoided, thereby increasing the size of the battery pack 20 in the Z direction, improving the space utilization, and improving the endurance of the vehicle 1.

Figure 18:
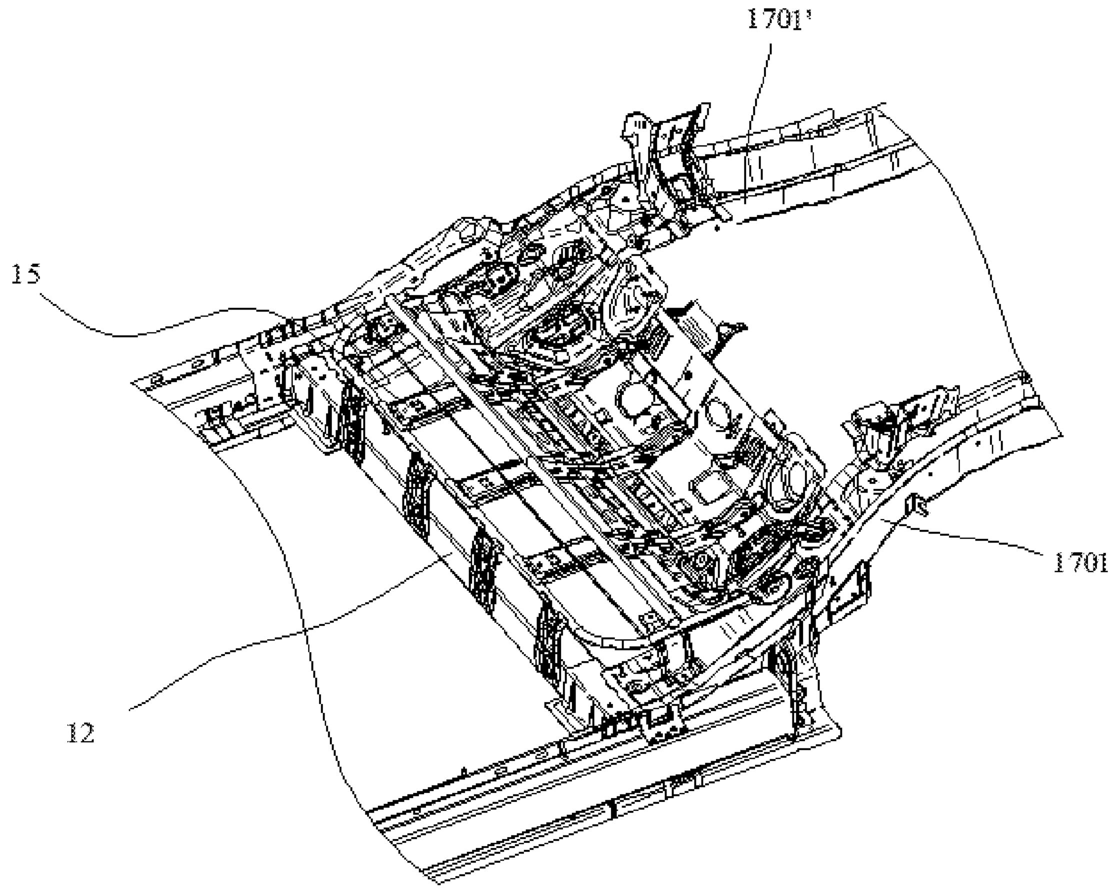
FIG. 18 is a schematic diagram of a structure of a rear portion of a vehicle body according to an embodiment of the present disclosure.

In some embodiments, as shown in FIG. 7 and FIG. 18, the rear longitudinal beam 17 includes the left rear longitudinal beam 1701 and the right rear longitudinal beam 1701', and two ends of the rear-seat front cross beam 12 are respectively connected to the left rear longitudinal beam 1701 and the right rear longitudinal beam 1701'. The left rear longitudinal beam 1701 and the right rear longitudinal beam 1701' extend in the length direction of the vehicle 1, and the two ends of the rear-seat front cross beam 12 may be respectively connected to the left rear longitudinal beam 1701 and the right rear longitudinal beam 1701'. When the collision occurs on the rear side of the vehicle 1, the rear collision force may be transmitted to the rear-seat front cross beam 12 through the rear longitudinal beam 1701 and the right rear longitudinal beam 1701', so that the rear collision force is relieved and distributed, the force carrying capability of the rear side of the vehicle 1 is improved, and the safety of the vehicle 1 is improved.

In some embodiments of the present disclosure, the height of the lower surface of the rear-seat front cross beam 12 in the height direction of the vehicle is higher than a height of the rear longitudinal beam 17 at a corresponding joint.

In some embodiments of the present disclosure, the rear-seat front cross beam 12, the left rear longitudinal beam 1701, the rear cross beam 11, and the right rear longitudinal beam 1701' are connected in a circumferential direction to form a closed frame structure. The rear-seat front cross beam 12, the left rear longitudinal beam 1701, the rear cross beam 11, and the right rear longitudinal beam 1701' are connected to form a rectangular structure. The structure can greatly improve the force transmission capability of the rear side of the vehicle 1, and the structure is further connected to the first rocker rail 18 and the second rocker rail 18'. Therefore, the force transmission path can be effectively increased, the side collision force, the front collision force, and the rear collision force are transmitted in a distributed manner, a force transmission capability is improved, and collision damage is effectively reduced.

In some embodiments of the present disclosure, the underbody 10 includes the first rocker rail 18 and the second rocker rail 18' that are oppositely arranged in the width direction of the vehicle body. The rear end surface 201 of the battery pack 20 is beyond the rear end surface of the first rocker rail 18 and the rear end surface of the second rocker rail 18' in the length direction of the vehicle. The rear end surface 201 of the battery pack 20 is beyond the rear end surface of the first rocker rail 18 and the rear end surface of the second rocker rail 18' backward in the length direction of the vehicle. Through this configuration, the capacity of the battery pack can be effectively increased, and the length of the battery pack is increased, so that the endurance of the vehicle is increased.

Figure 9:
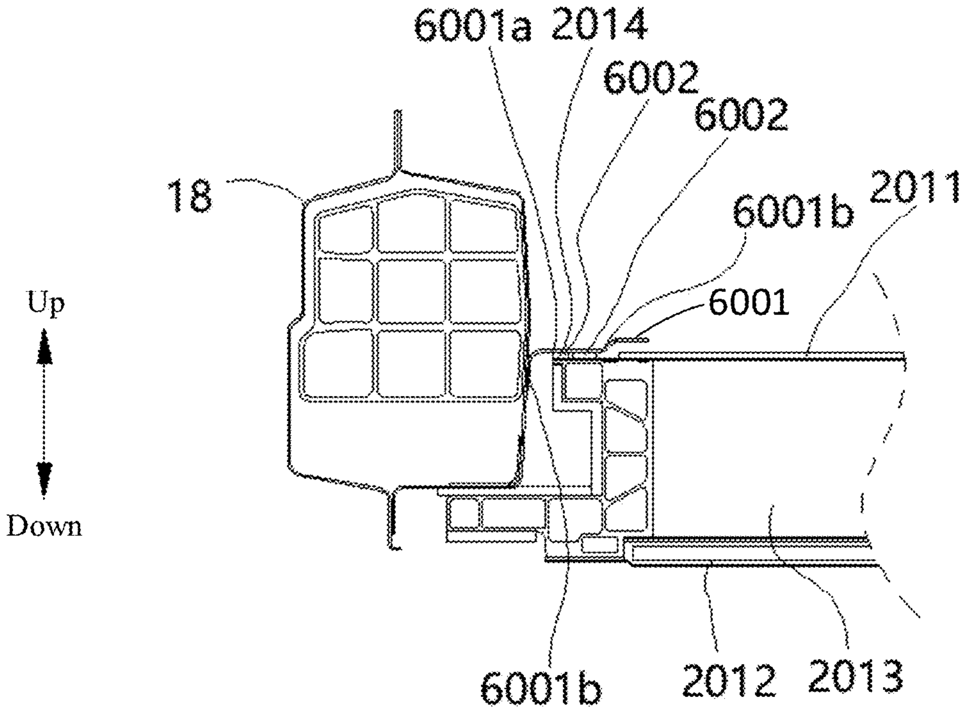
FIG. 9 is a cross-sectional view of a partial structure of a vehicle body according to an embodiment of the present disclosure.
Figure 10:
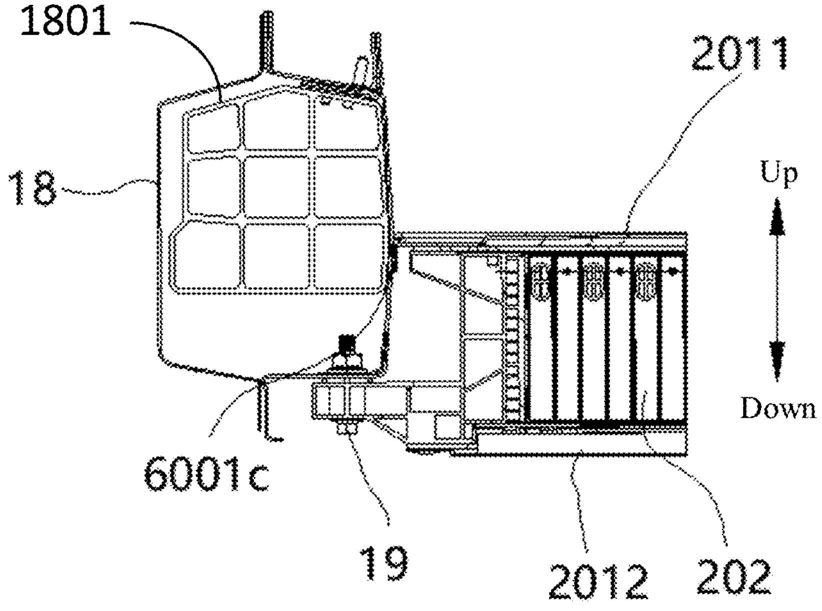
FIG. 10 is a cross-sectional view of a partial structure of a vehicle body according to an embodiment of the present disclosure.
Figure 11:
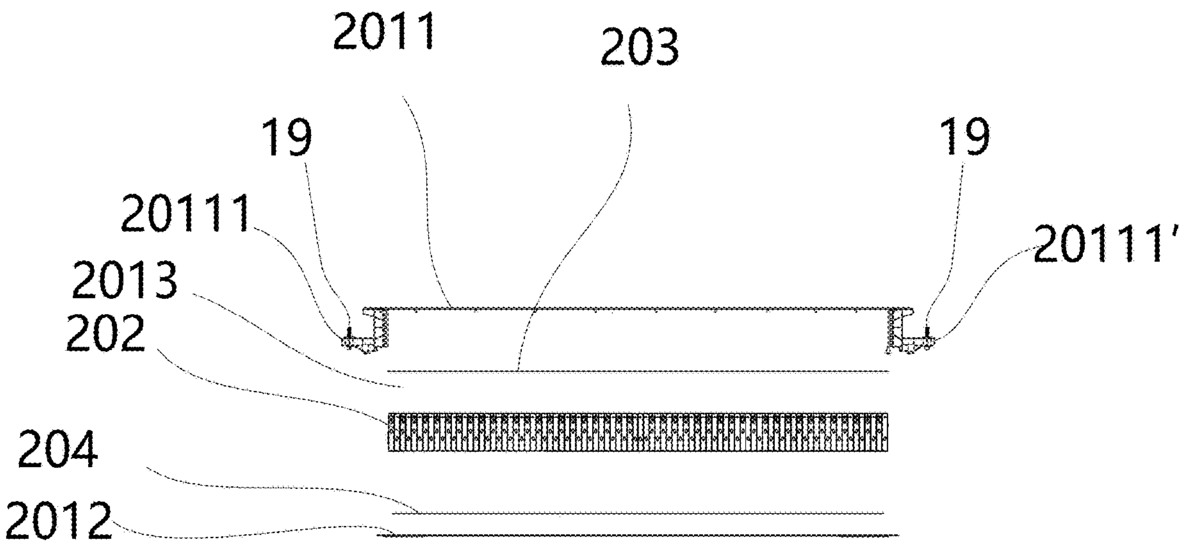
FIG. 11 is an exploded view of a battery pack according to an embodiment of the present disclosure.

In some embodiments, as shown in FIG. 9, FIG. 10, and FIG. 11, the battery pack 20 includes an upper housing 2011 of the battery pack, a lower housing 2012 of the battery pack, and at least one battery core 202. The upper housing 2011 of the battery pack and the lower housing 2012 of the battery pack form an accommodating space 2013, at least one battery core 202 is arranged/disposed in the accommodating space 2013, and at least a part of an upper surface of the upper housing 2011 of the battery pack forms at least a portion of the floor of the vehicle body. It may be understood that in an embodiment of the present disclosure, the upper housing 2011 of the battery pack and the floor of the vehicle body are integrated into a whole, that is, the floor of the vehicle body is omitted, and the floor of the vehicle body is replaced with the upper housing 2011 of the battery pack. This can effectively reduce a quantity of components, and effectively reduce a weight of the vehicle body, to improve the endurance of the vehicle to some extent.

In the Y direction of the vehicle 1, mounting parts on left and right sides of the upper housing 2011 of the battery pack are respectively fixedly connected to the first rocker rail 18 and the second rocker rail 18', so that the battery pack 20 can be mounted on the underbody 10. That is, a left extension portion 20111 of the upper housing 2011 of the battery pack is fixedly connected to the first rocker rail 18, and a right extension portion 20111' of the upper housing 2011 of the battery pack is fixedly connected to the second rocker rail 18'. Multiple through holes may be provided on each of the left extension portion and the right extension portion. Multiple through holes are provided at corresponding positions of the two rocker rails 18 and 18'. A bolt 19 or a screw may pass through the through holes to be fixedly connected to mounting holes, so that the battery pack 20 and the rocker rails 18 and 18' can be effectively fixedly connected. In an embodiment, the multiple through holes on the left extension portion and the right extension portion are arranged/disposed at intervals in the length direction of the vehicle 1, so that the battery pack 20 can be better connected to the vehicle 1.

An example in which the first rocker rail 18 is connected to the left extension portion 20111 is used for description below. Mounting holes (not shown) are provided on at intervals a first sill housing 1801 of the first rocker rail 18 in the length direction of the vehicle 1. Extension portion connection through holes (not shown) are provided on the left extension portion 20111 at positions corresponding to the first sill housing 1801. The first rocker rail 18 and the left extension portion 20111 are connected through the connecting bolt 19. Therefore, the connection reliability of the first rocker rail 18 can be improved, and the safety of the vehicle 1 is improved.

In some embodiments, the accommodating space 2013 accommodating at least one battery core 202 is formed between the upper housing 2011 of the battery pack and the lower housing 2012 of the battery pack, and the at least one battery core 202 is arranged in the accommodating space 2013. At least a part of the upper surface of the upper housing 2011 of the battery pack forms at least a portion of the floor of the vehicle body. In an embodiment of the present disclosure, the upper housing 2011 of the battery pack is a metal housing, and may be made of steel or another metal. In this way, when a part of the upper surface of the battery pack 20 forms the floor of the vehicle body, a load-bearing structure can be better formed, so that structural strength of the battery pack 20 cannot be too low, and protection for the battery pack 20 can be better formed, thereby better protecting the battery core 202, and improving safety and service life of the battery core 202. The at least a part of the upper surface of the upper housing 2011 of the battery pack forms the floor of the vehicle body, reducing a gap between the battery pack 20 and the vehicle body, which reduces driving noise, and can effectively increase the mounting space of the battery pack of the vehicle 1, so that the battery pack 20 can have a large electrical capacity, a total electrical capacity of the battery pack 20 is increased, and the endurance of the vehicle 1 is improved. In addition, the center of gravity of the vehicle can be lowered, vehicle handling is enhanced, a passenger compartment space in the vehicle is increased, and customer experience is effectively improved. In addition, material can be saved, a total weight of the vehicle 1 is reduced, and lightweight design of the vehicle 1 is easy to be implemented.

Figure 12:
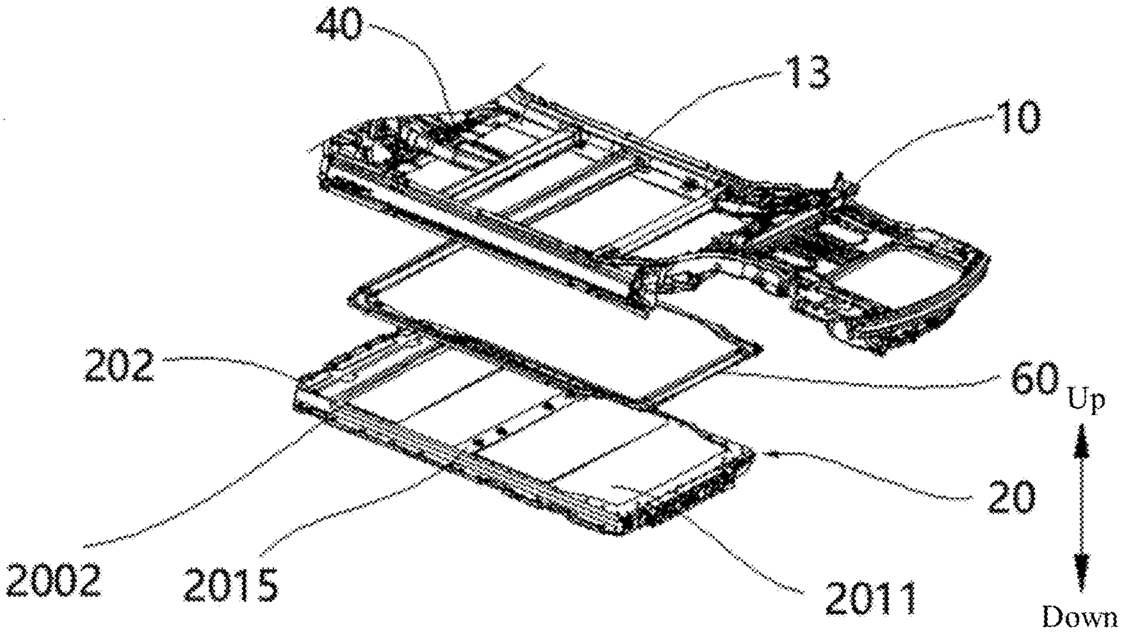
FIG. 12 is an exploded view of a partial vehicle body according to an embodiment of the present disclosure.

In some embodiments, as shown in FIG. 11 and FIG. 12, the battery core 202 is fixedly connected to the upper housing 2011 of the battery pack. Atop surface of the battery core 202 is bonded with the upper housing 2011 of the battery pack, and the lower housing 2012 of the battery pack may be a cooling plate. A bottom surface of the battery core 202 is bonded with the lower housing 2012 of the battery pack through a heat-conductive adhesive 204. This structure can eliminate the battery pack bottom surface housing in a conventional battery pack structure, but replace the battery pack bottom surface housing with a cooling plate, so that the weight of the battery pack 20 can be effectively reduced, and energy density of the battery pack 20 can be improved. The height of the battery 20 in the Z direction of the vehicle 1 can further be reduced, increasing the ground clearance of the vehicle, and providing the moving ability. In addition, the cooling plate is arranged on a lower side of the battery core 202, so that a thermal impact of the battery pack 20 on the passenger compartment can be effectively avoided, thereby improving passenger experience. In addition, an upper side of the battery core 202 is bonded with the upper housing 2011 of the battery pack, which can effectively fix the battery core 202, and can effectively enhance modality and strength of the upper housing 2011 of the battery pack, so that the upper housing 2011 of the battery pack can carry the weight of the passenger compartment loaded on the upper housing 2011 of the battery pack, and can also effectively participate in the force transmission of the vehicle 1. In an embodiment, when a side collision occurs on the vehicle 1, when forces on the rocker rail 18 and 18' are transmitted to the upper housing 2011 of the battery pack, the battery core 202 bonded with the upper housing 2011 of the battery pack can be effectively used for the force transmission. The lower side of the battery core 202 is bonded with the cooling plate, so that while the battery core 202 can be effectively fixed, heat transfer between the battery core 202 and the cooling plate can further be improved, heat transfer efficiency is improved, and thermal management efficiency is improved. The upper housing 2011 of the battery pack is sealed and connected to the lower housing 2012 of the battery pack, to prevent the service life of the battery pack 20 or the safety of the battery pack 20 being affected due to foreign substances entering an interior of the battery pack 20.

In the battery pack 20 in the present disclosure, the upper housing 2011 of the battery pack is used as the floor of the vehicle body, so that the battery core 202 does not fall off the upper housing 2011 of the battery pack when the battery pack 20 is subjected to a large force, connection stability of the battery core 202 can be improved, and the safety of the battery pack 20 can be ensured.

Figure 16:
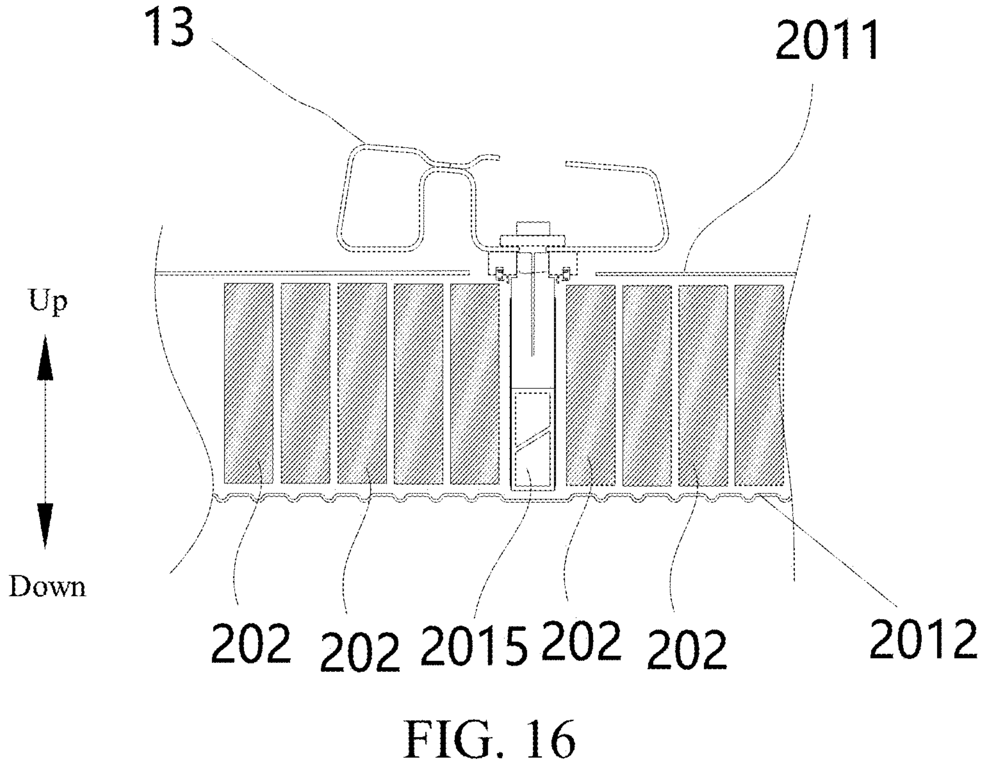
FIG. 16 is a cross-sectional view of a battery pack according to an embodiment of the present disclosure.

In some embodiments, as shown in FIG. 10, FIG. 11, and FIG. 16, the battery pack 20 may include at least one battery core 202, and a length direction of the battery core 202 is the same as the length direction of the vehicle 1. The at least one battery core 202 is arranged in the accommodating space 2013 of the battery pack 20, and the length direction of the battery core 202 is arranged in the length direction of the vehicle 1. Through this configuration, while the energy density of the battery pack 20 is improved, the battery core 202 is further effectively used for the force transmission. When the side collision occurs on the vehicle 1, a part of the battery core 202 with a large area is subjected to the collision force, so that a pressure can be effectively reduced, to avoid structural damage to the battery core 202, and the force transmission area can further be increased, to distribute the force to the length direction of the vehicle 1, thereby preventing local damage from being too large.

As shown in FIG. 10 and FIG. 11, the battery pack 20 includes multiple battery cores 202, and the multiple battery cores 202 are arranged side by side in the width direction of the vehicle 1. Through this configuration, the battery pack 20 may facilitate the battery core 202 participating in the force transmission when the side collision occurs on the vehicle 1, and facilitate improving the space utilization of the battery pack 20, so that a quantity of the battery cores 202 accommodated in the battery pack 20 is increased, thereby increasing a total electrical capacity of the battery pack 20, and improving the endurance of the vehicle 1.

In some embodiments, as shown in FIG. 12, a sealing plate assembly 60 is arranged on the underbody 10. The upper surface of the battery pack 20 is sealed and connected to the sealing plate assembly 60. The sealing plate assembly 60 is arranged on the underbody 10 of the vehicle 1, and seals at least one of joints between the top surface of the battery pack 20 and the front longitudinal beam 50, the frame structure, and the rear cross beam 11. The sealing plate assembly 60 is located between the underbody 10 and the battery pack 20. Through this configuration, the sealing plate assembly 60 can improve sealing of the vehicle 1.

Figure 13:
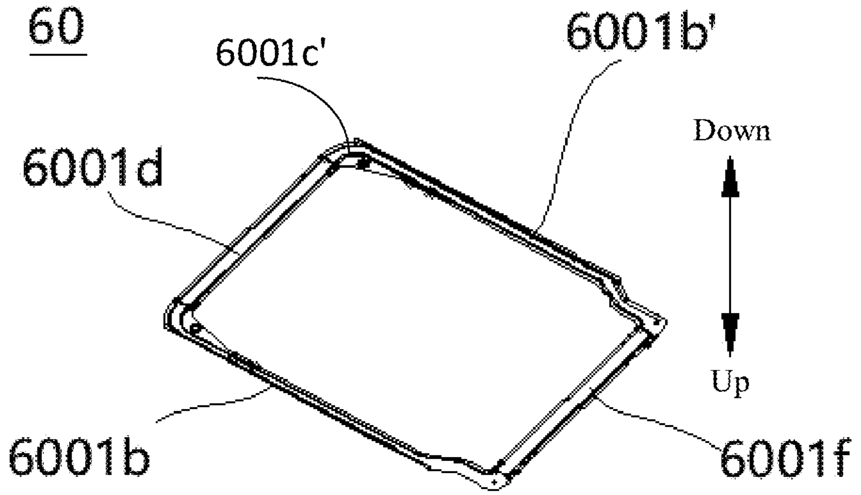
FIG. 13 is a schematic structural diagram of a sealing plate assembly according to an embodiment of the present disclosure.
Figure 14:
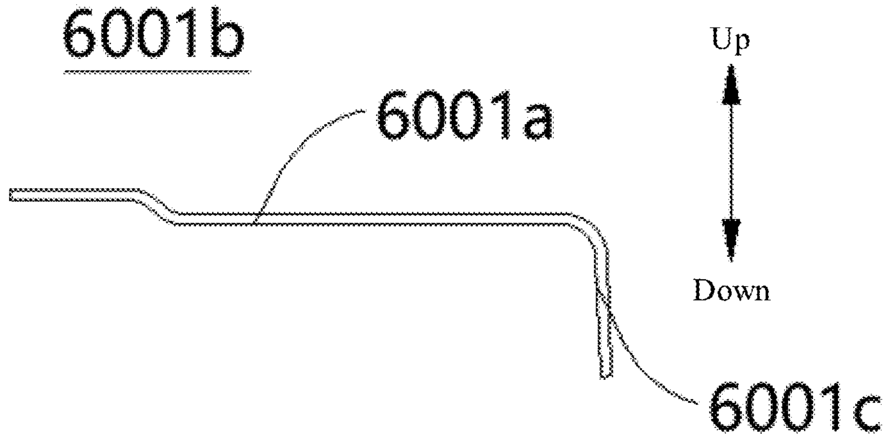
FIG. 14 is a cross-sectional view of a right sealing plate section according to an embodiment of the present disclosure.

In some embodiments, referring to FIG. 9 and with reference to FIG. 13, the sealing plate assembly 60 includes an annular sealing plate 6001 and at least one sealing member 6002. The sealing member 6002 is arranged between the sealing plate 6001 and the battery pack 20. In an embodiment of the present disclosure, the sealing plate assembly 60 is arranged between a rear side of the front longitudinal beam 50, a front side of the rear cross beam 11, and the two rocker rails to form a ring shape. The sealing plate assembly 60 is further connected to the rear longitudinal beam 17, the rear cross beam, and the two rocker rails, so that a seal can be effectively formed with the battery pack 20. Therefore, the passenger compartment can be completely sealed by the upper housing 2011 of the battery pack, thereby preventing substances outside the vehicle from entering the passenger compartment through a gap between the battery pack 20 and the vehicle body. The sealing member 6002 may be constructed in a ring shape, and two or more sealing members 6002 may be arranged. The two or more sealing members 6002 are arranged between the annular sealing plate 6001 and the battery pack 20, to form multi-level seal, so that a sealing effect can be better improved. The two or more sealing members are also annular sealing members and are arranged in a ring shape. For example, one of two adjacent sealing members is arranged on an inner side, the other is arranged on an outer side, and the two adjacent sealing members are spaced apart, improving the sealing effect of the sealing member 6002.

The sealing plate 6001 may be an integrally formed annular sealing plate, or may be an annular sealing plate formed by connecting multiple sub-sealing plates.

As shown in FIG. 9, the sealing plate 6001 includes a first plane portion 6001*a*, and the battery pack 20 includes a second plane portion 2014. The first plane portion 6001*a* is opposite to the second plane portion 2014, and the sealing member 6002 is arranged between the first plane portion 6001*a* and the second plane portion 2014. The first plane portion 6001*a* is arranged corresponding to the second plane portion 2014, and at least one sealing member 6002 is attached between the first plane portion 6001*a* and the second plane portion 2014, thereby ensuring the sealing effect of the sealing plate 6001, and improving the sealing of the vehicle 1.

In some embodiments, the sealing member 6002 is a silicone foam member. The silicone foam member has characteristics such as light weight, deformability, good sound insulation, and good thermal insulation. The sealing member 6002 is made of a foam member, so that the sealing member 6002 can insulate substances such as water and air, and can improve sound insulation of the vehicle 1 and comfort of passengers. The silicone foam member may have an amount of sealing compression, to ensure a sealing effect. In addition, the silicone foam member can improve thermal insulation of the sealing plate 6001, to prevent a high temperature of the battery pack 20 from being transferred upward, thereby ensuring the safety and reliability of the battery pack 20, and improving the safety of the vehicle 1. In addition, the silicone foam member can prevent heat transfer, thereby improving a heat sealing effect.

In some embodiments, as shown in FIG. 9, FIG. 10, FIG. 14, and FIG. 15, the first rocker rail 18 is arranged on the left side of the underbody 10, and the second rocker rail 18' is arranged on the right side of the underbody 10. The sealing plate 6001 includes a left sealing plate section 6001*b* and a right sealing plate section 6001*b*'. A left end of the left sealing plate section 6001*b* includes a left bent edge 6001*c*, and the left sealing plate section 6001*b* is connected to the first rocker rail 18 through the left bent edge 6001*c*. A right end of the right sealing plate section 6001*b*' includes a right bent edge 6001*c*, and the right sealing plate section 6001*b*' is connected to the second rocker rail 18' through the right bent edge 6001*c*'.

Connection between the first rocker rail 18 and the left sealing plate section 6001*b* is used as an example for description below. The left bent edge 6001*c* extending in a vertical direction is arranged on the left side of the left sealing plate section 6001*b*. In an embodiment, the left bent edge 6001*c* may be a bent edge extending upward or may be a bent edge extending downward. The left bent edge 6001*c* is fixedly connected to the first rocker rail 18, so that the left sealing plate section 6001*b* can be effectively fixed to the first rocker rail 18, connection reliability between the sealing plate 6001 and the first rocker rail 18 is ensured, and the sealing between the sealing plate 6001 and the vehicle 1 can also be effectively improved, thereby ensuring the reliability of the vehicle 1. In addition, the sealing plate 6001 may further prevent dust from entering the interior of the vehicle 1, thereby improving passenger comfort of the vehicle 1.

Figure 15:
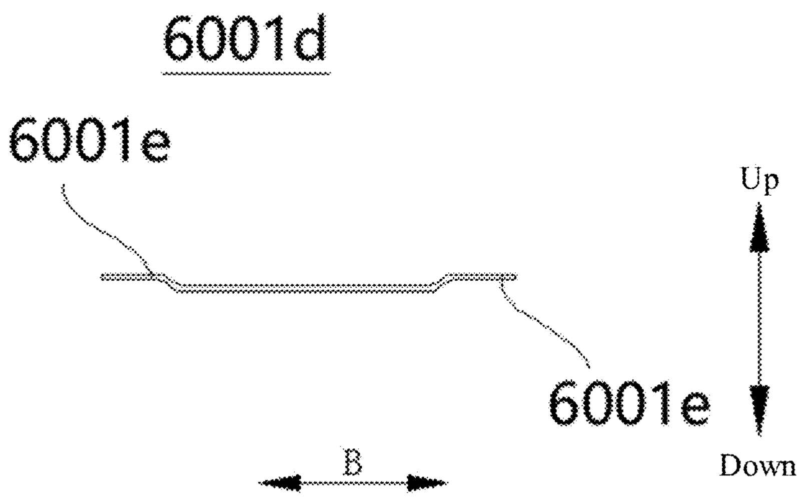
FIG. 15 is a cross-sectional view of a front sealing plate section according to an embodiment of the present disclosure.

In some embodiments, as shown in FIG. 13 and FIG. 15, the sealing plate 6001 further includes a front sealing plate section 6001*d* and a rear sealing plate section 6001*f* The front sealing plate section 6001*d* is connected to the front longitudinal beam 50, and the rear sealing plate section 6001*f* is connected to the rear cross beam 11. The sealing plate 6001 may include the front sealing plate section 6001*d* and the rear sealing plate section 6001*f* A front edgefold 6001*e* connected to the front longitudinal beam 50 is arranged on the front sealing plate section 6001*d*, and the front sealing plate section 6001*d* is fixedly connected to the front longitudinal beam 50 through the front edgefold 6001*e*. Arear edgefold connected to the rear cross beam 11 is arranged on the rear sealing plate section 6001*f*, and the rear sealing plate section 6001*f* is fixedly connected to the rear cross beam 11 through the rear edgefold. Such a connection structure can effectively improve the connection reliability of the sealing plate 6001, and can also improve the sealing.

It may be understood that, the plane portion arranged on the sealing plate assembly 60 and the plane portion arranged on the battery pack 20 enable better sealing, and the opposite plane portions enable better sealing of the sealing member 6002 at corresponding positions, thereby improving the sealing effect.

Figure 17:
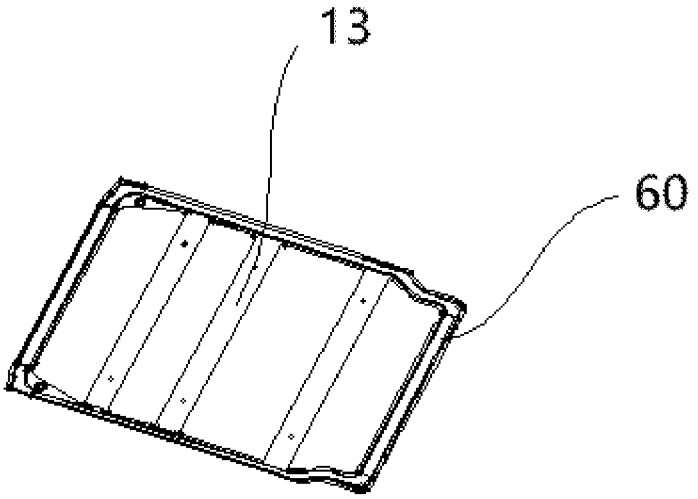
FIG. 17 is a schematic structural diagram of a sealing plate and a seat cross beam according to an embodiment of the present disclosure.

In some embodiments, referring to FIG. 12 and FIG. 16 and with reference to FIG. 17, a seat cross beam 13 extending in the left-right direction is arranged on the underbody 10. A battery pack reinforcing beam 2015 extending in a width direction is arranged on the battery pack 20. The battery pack 20 is connected to the seat cross beam 13 through the battery pack reinforcing beam 2015.

The seat cross beam 13 extending in the left-right direction may be arranged on the underbody 10. A seat is disposed on an upper side of the seat cross beam 13. The battery pack reinforcing beam 2015 extending in the width direction may be arranged on the battery pack 20 at a position corresponding to the seat cross beam 13. The battery pack 20 is connected to the seat cross beam 13 through the battery pack reinforcing beam 2015. The seat cross beam 13 can improve the connection reliability between the battery pack 2 and the underbody 10. In addition, when the vehicle 1 is subjected to the side collision force, the side collision force may be transmitted in the width direction of the vehicle 1 through the battery pack reinforcing beam 2015, so that the reliability of the vehicle 1 and the battery pack 20 is ensured.

In the description of the present disclosure, it should be understood that, orientations or position relationships indicated by terms such as “center”, “length”, “width”, “thickness”, “up”, “down”, “front”, “back”, “left”, “right”, “top”, “bottom”, “inner”, “outer”, “axial”, “radial”, and “circumferential” are orientations or position relationship shown based on the accompanying drawings, and are merely used for facilitating describing the present disclosure and simplifying the description, rather than indicating or implying that the apparatus or element should have a particular orientation or be constructed and operated in a particular orientation, and therefore, should not be construed as a limitation on the present disclosure.

In the description of the present disclosure, a “first feature” and a “second feature” may include one or more features. In the description of the present disclosure, “multiple” means two or more. In the description of the present disclosure, that a first feature is “above” or “below” a second feature may include that the first feature is in direct contact with the second feature, or may include that the first feature and the second feature are not in direct contact, but in contact through another feature between them. In the description of the present disclosure, that the first feature is “above” the second feature includes that the first feature is directly above or obliquely above the second feature, or merely represents that a horizontal height of the first feature is higher than the second feature.

In the description of this specification, the description of the reference terms such as “an embodiment”, “some embodiments”, “exemplary embodiments”, “example”, “specific example”, or “some examples” means that the features, structures, materials or characteristics described with reference to the embodiment or example are included in at least one embodiment or example of the present disclosure. In this specification, schematic descriptions of the foregoing terms do not necessarily direct at a same embodiment or example.

Although the embodiments of the present disclosure have been shown and described, a person of ordinary skill in the art should understand that various changes, modifications, replacements, and variations may be made to the embodiments without departing from the principles and spirit of the present disclosure, and the scope of the present disclosure is as defined by the appended claims and their equivalents.

What is claimed is:

1. A vehicle, comprising:
an underbody;
a rear subframe connected to the underbody; and
a battery pack connected to the underbody and disposed on a lower side of the underbody, wherein
a front end surface of the rear subframe comprises a limiting surface for the battery pack to extend backward, and at least a part of an upper surface of the battery pack forms at least a portion of a floor of a vehicle body,
wherein the underbody further comprises:
a first rocker rail; and
a second rocker rail disposed opposite to the first rocker rail in a width direction of the vehicle body, and the battery pack connected and mounted to the first rocker rail and the second rocker rail;
wherein the underbody further comprises a rear cross beam;
wherein a lower surface of the rear cross beam is spaced apart from the upper surface of the battery pack in a height direction of the vehicle body to form a sealed gap.

2. The vehicle according to claim 1, wherein a minimum distance between a rear end surface of the battery pack and the front end surface of the rear subframe is L, wherein L satisfies: 10 mm≤L≤100 mm.

3. The vehicle according to claim 1, wherein the underbody further comprises:
two rear longitudinal beams disposed spaced apart in the width direction of the vehicle body, and a height of a bottom surface of a front section of the rear longitudinal beam with respect to the ground in a height direction of the vehicle body being higher than a height of a top surface of the battery pack with respect to the ground in the height direction of the vehicle body.

4. The vehicle according to claim 3, wherein:
the rear cross beam extends in the width direction of the vehicle body, and is connected to the rear longitudinal beams, the first rocker rail, and the second rocker rail.

5. The vehicle according to claim 3, wherein the rear cross beam comprises:
a left connecting plate;
a right connecting plate; and
a rear cross beam body, wherein
the left connecting plate, the rear cross beam body, and the right connecting plate are connected.

6. The vehicle according to claim 5, wherein the rear longitudinal beam comprises:
a left rear longitudinal beam connected to the left connecting plate of the rear cross beam; and
a right rear longitudinal beam connected to the right connecting plate of the rear cross beam.

7. The vehicle according to claim 6, wherein:
the left connecting plate of the rear cross beam is disposed on a front section of the left rear longitudinal beam, and the right connecting plate of the rear cross beam is disposed on a front section of the right rear longitudinal beam;

the left connecting plate of the rear cross beam is connected to the first rocker rail and a left section of the rear cross beam body; and the right connecting plate of the rear cross beam is connected to the second rocker rail and a right section of the rear cross beam body.

8. The vehicle according to claim 6, wherein the rear cross beam further comprises a first boss disposed on the left connecting plate of the rear cross beam, and a second boss disposed on the right connecting plate of the rear cross beam, wherein:

a rear subframe mounting point is disposed on each of the first boss and the second boss, and the first boss and the second boss are disposed on a rear side of the rear cross beam body in a length direction of the vehicle body; and heights of a lower side surface of the first boss and of a lower end surface of the second boss with respect to the ground in the height direction of the vehicle body are higher than a height of a lower side surface of the rear cross beam body with respect to the ground in the height direction of the vehicle body.

9. The vehicle according to claim 8, wherein the underbody further comprises a rear-seat front cross beam extending in the width direction of the vehicle body and connected to the rear longitudinal beam, the first rocker rail, and the second rocker rail, and a height of a lower surface of the rear-seat front cross beam with respect to the ground in the height direction of the vehicle body is higher than a height of the upper surface of the battery pack with respect to the ground in the height direction of the vehicle body.

10. The vehicle according to claim 9, wherein:

two ends of the rear-seat front cross beam are respectively connected to the left rear longitudinal beam and the right rear longitudinal beam, and the rear-seat front cross beam, the left rear longitudinal beam, the rear cross beam, and the right rear longitudinal beam are connected to form a closed frame structure.

11. The vehicle according to claim 9, wherein:

the left rear longitudinal beam comprises a front section, a front portion of the front section of the left rear longitudinal beam is connected to the rear-seat front cross beam, a rear portion of the front section of the left rear longitudinal beam is connected to the left connecting plate of the rear cross beam, and a height of a bottom of the front section of the left rear longitudinal beam with respect to the ground in the height direction of the vehicle body is higher than the height of the upper surface of the battery pack with respect to the ground in the height direction of the vehicle body; and the right rear longitudinal beam comprises a front section, a front portion of the front section of the right rear longitudinal beam is connected to the rear-seat front cross beam, a rear portion of the front section of the right rear longitudinal beam is connected to the right connecting plate of the rear cross beam, and a height of a bottom of the front section of the right rear longitudinal beam with respect to the ground in the height direction of the vehicle body is higher than the height of the upper surface of the battery pack with respect to the ground in the height direction of the vehicle body.

12. The vehicle according to claim 4, wherein the underbody further comprises a front longitudinal beam, a bottom surface of a rear end of the front longitudinal beam is spaced apart from the top surface of the battery pack in the height direction of the vehicle body to form a sealed gap; or the underbody further comprises a front cross beam, a front longitudinal beam, and A-pillars disposed oppositely, two ends of the front cross beam are connected to the A-pillars, and the front longitudinal beam is connected to the front cross beam.

13. The vehicle according to claim 12, further comprising a sealing plate assembly disposed on the underbody, wherein:

the upper surface of the battery pack is sealed by the sealing plate assembly, and the sealing plate assembly comprises:

a sealing plate; and at least one sealing member disposed between the sealing plate and the battery pack, wherein the sealing plate comprises a first plane portion, the battery pack comprises a second plane portion, the first plane portion is opposite to the second plane portion, and the sealing member is disposed between the first plane portion and the second plane portion, the first rocker rail is disposed on a left side of the underbody, and the second rocker rail is disposed on a right side of the underbody; and the sealing plate comprises a left sealing plate section and a right sealing plate section, a left end of the left sealing plate section comprises a left bent edge, the left sealing plate section is connected to the first rocker rail by the left bent edge, a right end of the right sealing plate section comprises a right bent edge, and the right sealing plate section is connected to the second rocker rail by the right bent edge, and the sealing plate further comprises a front sealing plate section and a rear sealing plate section, the front sealing plate section is connected to the front longitudinal beam, and the rear sealing plate section is connected to the rear cross beam.

14. The vehicle according to claim 1, wherein a rear end surface of the battery pack is beyond a rear end surface of the first rocker rail and a rear end surface of the second rocker rail in a length direction of the vehicle body.

15. The vehicle according to claim 1, further comprising:

a front subframe connected to the underbody, wherein a rear end surface of the front subframe comprises a limiting surface for the battery pack to extend forward.

16. The vehicle according to claim 1, wherein the battery pack comprises:

an upper housing;

a lower housing; and at least one battery core, wherein the upper housing and the lower housing form an accommodating space, the at least one battery core is disposed in the accommodating space, at least a part of an upper surface of the upper housing forms at least a portion of a floor of the vehicle body, the battery core is connected to the upper housing, a top surface of the battery core is bonded with the upper housing, the lower housing is a cooling plate, and a bottom surface of the at least one battery core is bonded with the lower housing through a heat-conductive adhesive.

17. The vehicle according to claim 16, wherein the at least one battery core comprises a plurality of battery cores, a length direction of the battery cores is consistent with the length direction of the vehicle body, and the battery cores are disposed side by side in a width direction of the vehicle body.

18. The vehicle according to claim 1, further comprising a seat cross beam extending in a width direction of the vehicle body and disposed on the underbody; and a battery pack reinforcing beam extending in the width direction of the vehicle body and disposed on the battery pack, wherein the battery pack reinforcing beam is connected to the seat cross beam.

* * * * *